United States Patent
Morikawa

(10) Patent No.: US 9,321,482 B2
(45) Date of Patent: Apr. 26, 2016

(54) STEERING DEVICE

(71) Applicant: Nissan Motor Co., Ltd., Yokohama-shi, Kanagawa (JP)

(72) Inventor: Kunihiko Morikawa, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 88 days.

(21) Appl. No.: 14/374,683

(22) PCT Filed: Feb. 26, 2013

(86) PCT No.: PCT/JP2013/054922
§ 371 (c)(1),
(2) Date: Jul. 25, 2014

(87) PCT Pub. No.: WO2013/133089
PCT Pub. Date: Sep. 12, 2013

(65) Prior Publication Data
US 2015/0014952 A1    Jan. 15, 2015

(30) Foreign Application Priority Data

Mar. 8, 2012  (JP) ................................ 2012-051372

(51) Int. Cl.
*B62D 11/02*  (2006.01)
*B62D 7/15*   (2006.01)
*B62D 3/02*   (2006.01)
*B62D 6/00*   (2006.01)
*B62D 7/09*   (2006.01)

(52) U.S. Cl.
CPC  *B62D 11/02* (2013.01); *B62D 3/02* (2013.01); *B62D 6/002* (2013.01); *B62D 7/09* (2013.01); *B62D 7/1509* (2013.01)

(58) Field of Classification Search
CPC ............ B62D 11/02; B62D 3/02; B62D 7/09; B62D 7/1509; B62D 6/02
USPC ......................................... 280/91.1; 180/234
See application file for complete search history.

(56) References Cited

U.S. PATENT DOCUMENTS

| 5,014,802 | A  | * | 5/1991  | Knoll   | B62D 7/159  |
|           |    |   |         |         | 180/408     |
| 5,143,400 | A  | * | 9/1992  | Miller  | B62D 17/00  |
|           |    |   |         |         | 180/413     |
| 5,402,344 | A  | * | 3/1995  | Reister | B62D 7/159  |
|           |    |   |         |         | 180/197     |
| 2004/0195013 | A1 | * | 10/2004 | Spark   | B60L 15/2036 |
|           |    |   |         |         | 180/6.24    |
| 2005/0217906 | A1 | * | 10/2005 | Spark   | B60T 8/24   |
|           |    |   |         |         | 180/22      |
| 2005/0230179 | A1 |   | 10/2005 | Nakatsu et al. | |

FOREIGN PATENT DOCUMENTS

| JP | 2007-22159 A  | 2/2007 |
| JP | 2009-78638 A  | 4/2009 |
| JP | 2010-76528 A  | 4/2010 |
| WO | 2005/101945 A2 | 11/2005 |
| WO | 2005/101945 A3 | 11/2005 |

* cited by examiner

*Primary Examiner* — James English
(74) *Attorney, Agent, or Firm* — Global IP Counselors, LLP

(57) ABSTRACT

Left and right front wheels are steered by rotation of steering shafts, and a steering force from a steering wheel is inputted into the steering shaft. Mutually adjacent ends of the shafts are coupled to a ring gear and a sun gear of a planetary gear set, a steering angle adjustment motor is drivably coupled to a carrier of the planetary gear set, and the rotation ratio between the shafts is made changeable. Left and right rear wheels are steered by rotation of steering shafts, and a steering force from a steering motor is inputted into the shaft. Mutually adjacent ends of the shafts are respectively coupled to a ring gear and a sun gear of a planetary gear set, a steering angle adjustment motor is drivably coupled to a carrier of the planetary gear set, and the rotation ratio between the shafts is made changeable.

19 Claims, 17 Drawing Sheets

STEERING DEVICE

CROSS-REFERENCE TO RELATED APPLICATIONS

This application is a U.S. National stage application of International Application No. PCT/JP2013/054922, filed Feb. 26, 2013, which claims priority to Japanese Patent Application No. 2012-051372 submitted on Mar. 8, 2012, the contents of which are hereby incorporated herein by reference.

BACKGROUND

1. Field of the Invention

The present invention relates to an improvement regarding a steering device in which left and right front wheels and left and right rear wheels are steered by rotation, about the longitudinal axis, of a steering shaft provided to each of the wheels so as to extend inwards along the vehicle width direction.

2. Background Information

Steering devices of such type are able to select, other than the common two-wheel maneuver mode through steering of left and right front wheels only, a variety of maneuver modes such as a sharp-turn mode in which the vehicle performs a sharp turn by reverse-phase-steering the left and right front wheels and the left and right rear wheels, a pivot-turn (on-the-spot-turn) mode in which the vehicle is turned at the present position, or a parallel movement maneuver mode in which all of the left and right front wheels and the left and right rear wheels are similarly steered, and are useful for electric vehicles for which large steering actions are a strong-point.

Steering devices of such description proposed in the past include, e.g., the device disclosed in Japanese Laid-Open Patent Application No. 2007-022159.

In this proposed technique, there are provided a forward/reverse switching mechanism for switching the rotation direction between the left- and right-wheel steering shafts, and a steering gear set for converting the rotation of the left- and right-wheel steering shafts into a rotation about left- and right-wheel kingpin axes in assisting with steering of the left and right wheels, the steering gear set comprising variable speed ratio gears, and non-circular gears in which the pitch curve is changed in two stages are used as the variable speed ratio gears.

According to this steering device, it is possible to operate the forward/reverse switching mechanism to select the required vehicle maneuver mode, i.e., one of the above-mentioned two-wheel maneuver mode, sharp-turn mode, pivot-turn mode, and parallel movement maneuver mode.

SUMMARY

However, in the conventional steering device proposed in Japanese Laid-Open Patent Application No. 2007-022159, the pitch curve of the steering gear set is set so that the center of vehicle turn is located at two locations, i.e., the extension line of the rear wheel axis or the extension line, in the vehicle width direction, passing through the center of the wheel base. Therefore, a problem is presented in that when an attempt is made to set the center of vehicle turn to an arbitrary position, the steering angle of the left and right front wheels and the steering angle of the left and right rear wheels do not satisfy the Ackermann-Jeantaud relationship, and uneven wear and squealing of the wheel tires occur.

When an attempt is made to perform a sharp turn through a large-steering-angle of the left and right front wheels only, since the pitch curve of the steering gear set used for large steering angles of the front wheels is set as described above, i.e., the pitch curve of the steering gear set is set so that the center of the vehicle turn is positioned on the extension line, in the vehicle width direction, passing through the center of the wheel base on the assumption that the rear wheels are also steered, the turning angle of the left and right front wheels no longer satisfies the Ackermann-Jeantaud relationship, and uneven wear and squealing of the wheel tires occur.

If the turning angle of the left and right front wheels satisfies the Ackermann-Jeantaud relationship in order to solve this problem, a problem is presented in that the steering angle of the left and right front wheels is restricted, resulting in the prevention of the desired sharp turn.

On the basis of a recognition of the fact that conventionally, since the rotation ratio is fixed between left and right steering shafts, when the wheels are steered so as to set the center of vehicle turn to an arbitrary position in order to realize a variety of maneuver modes, the Ackermann-Jeantaud relationship is no longer satisfied and the above problems of uneven wear and squealing of wheel tires are generated, an object of the present invention is to provide a steering device in which the rotation ratio can be changed between the left and right steering shafts and the center of vehicle turn can be set to an arbitrary position while satisfying the Ackermann-Jeantaud relationship, whereby the various maneuver modes can be realized without the above problems of uneven wear and squealing of the wheel tires being generated.

In order to achieve the above objective, a steering device according to the present invention is configured as follows. First, a description will be given for a steering device according to the present invention. The steering device according to the present invention is a steering device for a vehicle in which left and right front wheels and left and right rear wheels are steered through a rotation, about the longitudinal axis, of a steering shaft provided to each wheel so as to extend inwards along the vehicle width direction.

The present invention is a steering device of such description in which:

a steering force source for transmitting a steering force in correspondence with a steering operation performed by a driver is provided individually to one of the left- and right-front-wheel steering shaft and to one of the left- and right-rear-wheel steering shaft;

a differential gear set is interposed respectively between mutually adjacent ends of the left- and right-front-wheel steering shafts and between mutually adjacent ends of the left- and right-rear-wheel steering shafts; and two rotation elements of each of the differential gear sets are coupled respectively to corresponding mutually adjacent ends of the left- and right-front-wheel steering shafts and mutually adjacent ends of left- and right-rear-wheel steering shafts, and a corresponding front-wheel steering angle adjustment actuator and rear-wheel steering angle adjustment actuator are drivably coupled to a remaining rotation element of each of the differential gear sets.

In the steering device of the present invention, it is possible to change the rotation ratio between left- and right-front-wheel steering shafts using the front-wheel steering angle adjustment actuator through the corresponding differential gear set, and to change the rotation ratio between left- and right-rear-wheel steering shafts using the rear-wheel steering angle adjustment actuator through the corresponding differential gear set.

Therefore, it is possible to steer the left and right front wheels and the left and right rear wheels in a manner in which the center of vehicle turn can be set to an arbitrary position while satisfying the Ackermann-Jeantaud relationship, and to achieve a variety of maneuver modes without the problems of uneven wear and squealing of the wheel tires being generated.

BRIEF DESCRIPTION OF THE DRAWINGS

Referring now to the attached drawings which form a part of this original disclosure.

FIG. 3A is an outline diagram schematically showing the main parts of the front-wheel steering system and FIG. 3B is a nomogram showing the rotation speed relationship between members in the steering angle adjustment differential gear set in the front-wheel steering system in an instance in which the left and right front wheels are steered as shown in FIG. 1;

FIG. 4A is an outline diagram schematically showing the main parts of the rear-wheel steering system and FIG. 4B is a nomogram showing the rotation speed relationship between members in the steering angle adjustment differential gear set in the rear-wheel steering system in an instance in which the left and right rear wheels are in a non-steering state as shown in FIG. 1;

FIG. 6A is a nomogram for the front-wheel steering angle adjustment differential gear set in an instance in which the left and right front wheels are steered as shown in FIG. 5 and FIG. 6B is a nomogram for the rear-wheel steering angle adjustment differential gear set in an instance in which the left and right rear wheels are steered as shown in FIG. 5;

FIG. 8A is a nomogram for the front-wheel steering angle adjustment differential gear set in an instance in which the left and right front wheels are steered as shown in FIG. 7 and FIG. 8B is a nomogram for the rear-wheel steering angle adjustment differential gear set in an instance in which the left and right rear wheels are steered as shown in FIG. 7;

FIG. 10A is a nomogram for the front-wheel steering angle adjustment differential gear set in an instance in which the left and right front wheels are steered as shown in FIG. 9 and FIG. 10B is a nomogram for the rear-wheel steering angle adjustment differential gear set in an instance in which the left and right rear wheels are steered as shown in FIG. 9;

FIG. 11A is an outline diagram schematically showing the main parts of the front-wheel steering system including the front-wheel steering angle adjustment differential gear set, and FIG. 11B is a nomogram showing the rotation speed relationship between members in the front-wheel steering angle adjustment differential gear set in an instance in which the two-wheel maneuver mode shown in FIG. 1, in which only the left and right front wheels are steered, is enabled;

FIG. 15A is an outline diagram schematically showing the main parts of the front-wheel steering system including the front-wheel steering angle adjustment differential gear set, and FIG. 15B is a nomogram showing the rotation speed relationship between members in the front-wheel steering angle adjustment differential gear set in an instance in which the lock mechanism of the front-wheel steering angle adjustment differential gear set is operating;

FIG. 17A is a nomogram for the front-wheel steering angle adjustment differential gear set and FIG. 17B is a nomogram for the rear-wheel steering angle adjustment differential gear set;

FIG. 18A is a nomogram for the front-wheel steering angle adjustment differential gear set and FIG. 18B is a nomogram for the rear-wheel steering angle adjustment differential gear set;

FIG. 19A is a nomogram for the front-wheel steering angle adjustment differential gear set and FIG. 19B is a nomogram for the rear-wheel steering angle adjustment differential gear set;

DETAILED DESCRIPTION OF EMBODIMENTS

Embodiments of the present invention will now be described with reference to the accompanying drawings.

Embodiment 1

<Configuration>

Figure 1:
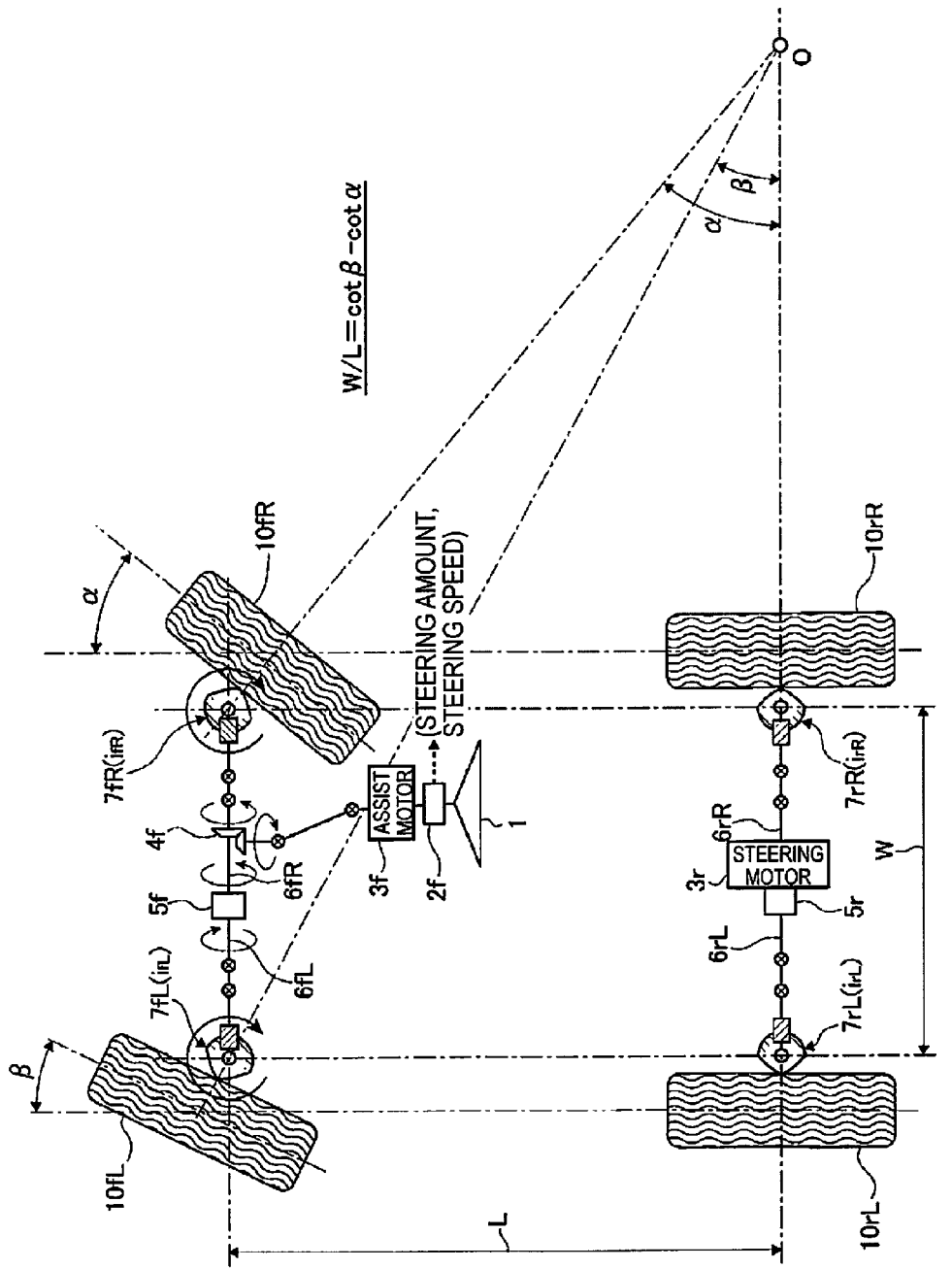
FIG. 1 is a schematic plan view in which front- and rear-wheel steering systems of an electric vehicle provided with a steering device representing a first embodiment of the present invention are shown for an instance in which a two-wheel maneuver mode in which only the left and right front wheels are steered is selected.

FIG. 1 is a schematic plan view showing front- and rear-wheel steering systems of an electric vehicle provided with a steering device corresponding to a first embodiment of the present invention.

The electric vehicle in FIG. 1 is provided with left and right front wheels 10fL, 10fR and left and right rear wheels 10rL, 10rR, and is guided by all of the wheels being steered in correspondence with an operation (steering amount and steering speed) performed on a steering wheel 1.

FIG. 1 shows the state in which only the left and right front wheels 10fL, 10fR are steered and the electric vehicle is capable of turning about a point O located on an extension line of the axes of the left and right rear wheels 10rL, 10rR.

First, the steering system for the left and right front wheels 10fL, 10fR will be described below.

The left and right front wheels 10fL, 10fR are respectively provided with left- and right-front-wheel steering shafts 6fL, 6fR extending inwards in the vehicle width direction from the wheels, and are steered by rotation, about the longitudinal axes of the left- and right-front-wheel steering shafts 6fL, 6fR.

Therefore, there are provided steering gear sets 7fL, 7fR (having gear ratios $i_{fL}$, $i_{fR}$) for converting the rotation of the steering shafts 6fL, 6fR about the longitudinal axes into a rotation of the corresponding left and right front wheels 10fL, 10fR about kingpin axes in assisting with the steering of the left and right front wheels 10fL, 10fR. The left and right front wheels 10fL, 10fR are respectively steerably coupled to outer ends, with respect to the vehicle width direction, of the steering shafts 6fL, 6fR with the steering gear sets 7fL, 7fR interposed therebetween.

Figure 2:
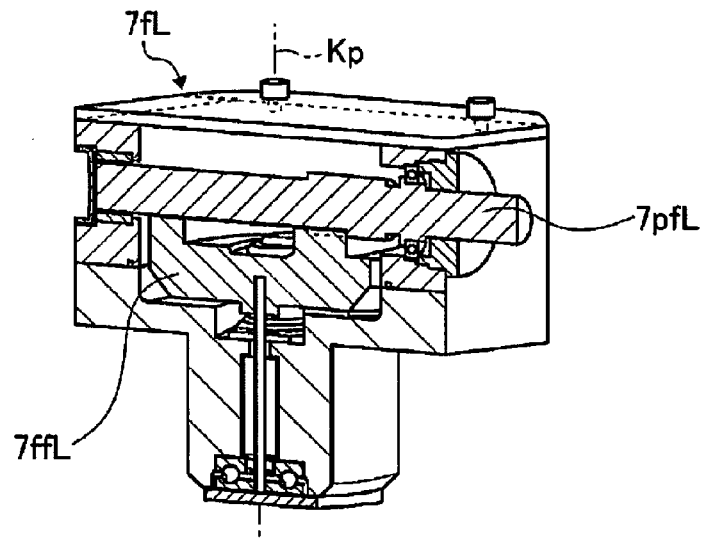
FIG. 2 is a main part cutaway perspective view showing a wheel-steering gear set for the left front wheel as a representative of a wheel-steering gear set in the steering device in FIG. 1.

The steering gear sets 7fL, 7fR are similar, and are configured as described below with reference to FIG. 2 for the left-front-wheel steering gear set 7fL.

The left-front-wheel steering gear set 7fL is provided with a pinion 7pfL drivably coupled to the outer end of the left front wheel steering shaft 6fL, and a face gear 7ffL disposed on the kingpin axis Kp of the left front wheel 10fL and adapted so as to be capable of rotating about the axis.

The pinion 7pfL is caused to engage with the face gear 7ffL so that the rotation of the steering shaft 6fL can be converted to a rotation of the face gear 7ffL about the kingpin axis Kp, and the left front wheel 10fL is coupled to the face gear 7ffL so as to be capable of being steered about the kingpin axis Kp.

The face gear 7ffL is pressed against the pinion 7pfL by an elastic body such as a spring (not shown), and adapted to remove the backlash between the face gear 7ffL and the pinion 7pfL.

The left and right front wheels 10fL, 10fR use the steering wheel 1 and a power steering assist motor 3f for assisting the steering force from the steering wheel 1 as steering force sources. The output shaft of the assist motor 3f is coupled in an intersecting manner by an intersecting shaft gear 4f to the steering shaft 6fR of the right front wheel 10fR.

A front-wheel differential gear set 5f is interposed between mutually adjacent ends of the left- and right-front-wheel steering shafts 6fL, 6fR on the inward side with respect to the vehicle width direction. The mutually adjacent ends of the left- and right-front-wheel steering shafts 6fL, 6fR are associated across the differential gear set 5f as follows.

Figure 3A:
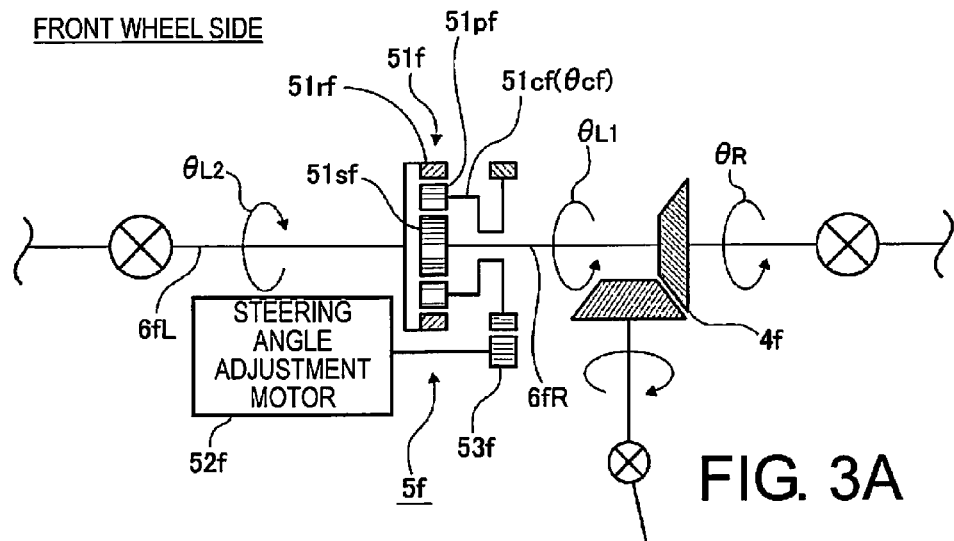
FIGS. 3A and 3B show the front-wheel steering system in the steering device of FIG. 1, where

The front-wheel differential gear set 5f comprises a single-pinion-type planetary gear set (simple planetary gear set) 51f as shown in FIG. 3A. The single-pinion-type planetary gear set 51f comprises a sun gear 51sf, a ring gear 51rf, and a carrier 51cf for rotatably supporting a pinion 51pf which engages with each of the gears. The sun gear 51sf is coupled to the steering shaft 6fR on the side at which the steering force from the steering wheel 1 is inputted. The ring gear 51rf is coupled to the steering shaft 6fL on the opposite side. The carrier 51cf is drivably coupled to a steering angle adjustment motor 52f through a reduction gear 53f.

The arrows on the front wheel side in FIG. 1 are directions of rotation of the respective elements when the left and right front wheels 10fL, 10fR are steered to the right.

According to the above front wheel steering system shown in FIGS. 1 and 3A, the steering force from the steering wheel 1, after being amplified by the assist motor 3f, reaches the right front wheel 10fR through the intersecting shaft gear 4f, the steering shaft 6fR, and the steering gear set 7fR, and enables the right front wheel 10fR to be steered at a value corresponding to the steering angle of the steering wheel 1.

Meanwhile, the steering force on the steering shaft 61R reaches, from the sun gear 51sf, the ring gear 51rf with the carrier 51cf acting as a reaction force receiver, then reaches the left front wheel 10fL through the steering shaft 611 and the steering gear set 7fL, whereby the left front wheel 1011 can be steered.

At this time, the steering angle adjustment motor 52f can be operated, whereby the rotation ratio of the steering shaft 6fL relative to the steering shaft 6fR can be arbitrarily changed, and the steering angle of the left front wheel 10fL relative to the steering angle of the right front wheel 10*f*R can be set as shown in FIG. 1 or otherwise arbitrarily set as described in detail further below.

In order to perform a control when the rotation ratio of the steering shaft 6*f*L relative to the steering shaft 6*f*R is changed, a steering sensor 2*f* for detecting the amount of operation (steering angle) and the speed of operation (steering speed) of the steering wheel 1 is provided to a steering column shaft which rotates with the steering wheel 1.

Therefore, the steering sensor 2*f* corresponding to the steering operation detection means of the present invention.

Next, the steering system for the left and right rear wheels 10*r*L, 10*r*R will be described below.

The left and right rear wheels 10*r*L, 10*r*R are respectively provided with left- and right-rear-wheel steering shafts 6*r*L, 6*r*R extending inwards in the vehicle width direction from the wheels, and are steered by rotation of the left- and right-rear-wheel steering shafts 6*r*L, 6*r*R about the longitudinal axes.

Therefore, there are provided steering gear sets 7*r*L, 7*r*R (having gear ratios $i_{rL}$, $i_{rR}$) for converting the rotation of the steering shafts 6*r*L, 6*r*R about the longitudinal axes into a rotation of the corresponding left and right rear wheels 10*r*L, 10*r*R about kingpin axes in assisting the steering in assisting the steering of the left and right rear wheels 10*r*L, 10*r*R. The left and right rear wheels 10*r*L, 10*r*R are respectively steerably coupled to outer ends, with respect to the vehicle width direction, of the steering shafts 6*r*L, 6*r*R with the steering gear sets 7*r*L, 7*r*R interposed therebetween. Each of the steering gear sets 7*r*L, 7*r*R are similar to the left-front-wheel steering gear set 7*f*L described above with reference to FIG. 2.

The left and right rear wheels 10*r*L, 10*r*R use a rear-wheel steering motor 3*r* as a steering force source. The output shaft of the rear-wheel steering motor 3*r* is drivably coupled to the steering shaft 6*r*R of the right rear wheel 10*r*R.

A rear-wheel differential gear set 5*r* is interposed between mutually adjacent ends of the left- and right-rear-wheel steering shafts 6*r*L, 6*r*R on the inward side with respect to the vehicle width direction. The mutually adjacent ends of the left- and right-rear-wheel steering shafts 6*r*L, 6*r*R are linked across the rear-wheel differential gear set 5*r* as follows.

Figure 4A:
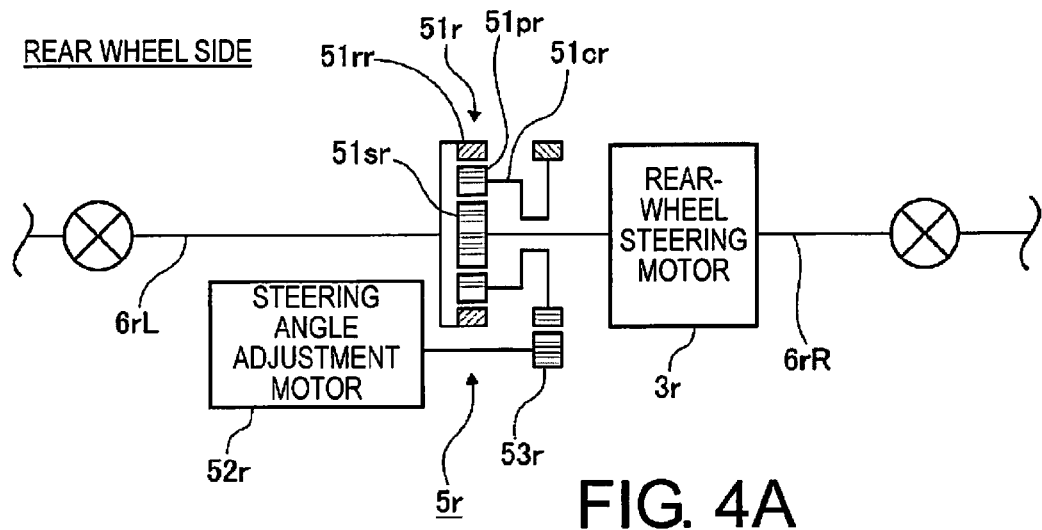
FIGS. 4A and 4B show the rear-wheel steering system in the steering device of FIG. 1, where

The rear-wheel differential gear set 5*r* comprises a single-pinion-type planetary gear set (simple planetary gear set) 51*r* as shown in FIG. 4A. The single-pinion-type planetary gear set 51*r* comprises a sun gear 51*sr*, a ring gear 51*rr*, and a carrier 51*cr* for rotatably supporting a pinion 51*pr* which engages with each of the gears.

The sun gear 51*sr* is coupled to the steering shaft 6*r*R on the side at which the steering force from the rear-wheel steering motor 3*r* is inputted. The ring gear 51*rr* is coupled to the steering shaft 6*r*L on the opposite side. The carrier 51*cr* is drivably coupled to a steering angle adjustment motor 52*r* through a reduction gear 53*r*.

According to the above rear wheel steering system shown in FIGS. 1 and 4A, the steering force from the rear-wheel steering motor 3*r* reaches the right rear wheel 10*r*R through the steering shaft 6*r*R and the steering gear set 7*r*R, and enables the right front wheel 10*r*R to be steered at a value corresponding to the rotation angle of the rear-wheel steering motor 3*r*.

Meanwhile, the steering force on the steering shaft 6*r*R reaches, from the sun gear 51*sr*, the ring gear 51*rr* with the carrier 51*cr* acting as a reaction force receiver, then reaches the left rear wheel 10*r*L through the steering shaft 6*r*L and the steering gear set 7*r*L, whereby the left rear wheel 10*r*L can be steered.

At this time, the steering angle adjustment motor 52*r* can be operated, whereby the rotation ratio of the steering shaft 6*r*L relative to the steering shaft 6*r*R can be arbitrarily changed, and the steering angle of the left rear wheel 10*r*L relative to the steering angle of the right rear wheel 10*r*R can be arbitrarily set.

FIG. 1 shows a state in which neither of the left and right rear wheels 10*r*L, 10*r*R are being steered.

Figure 3B:
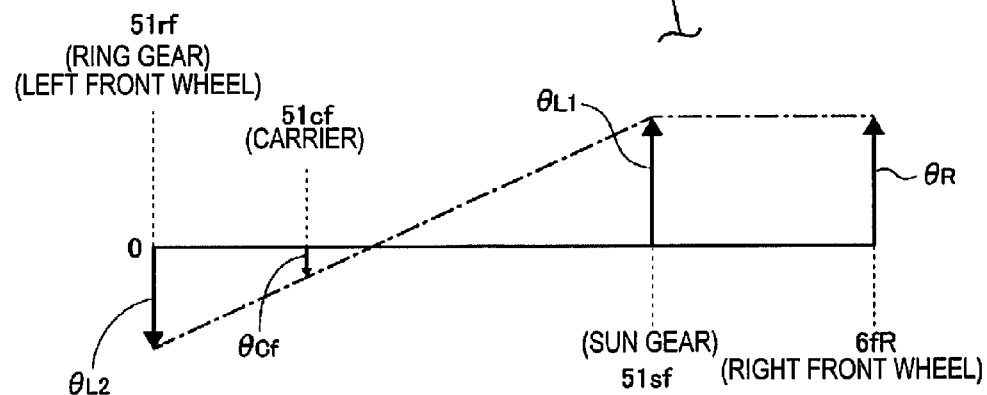

FIG. 3B is a nomogram showing the rotation speed relationship between the members in the differential gear set 5*f* in an instance in which the rotation axes of the left and right front wheels 10*f*L, 10*f*R intersect the extension line of the rear axes of the left and right rear wheels 10*r*L, 10*r*R in a non-steered state as shown in FIG. 1 at the same point O as a result of the left front wheel 10*f*L being imparted, by the steering angle adjustment motor 52*f* in FIG. 3A through the differential gear set 5*f*, with a steering angle β different from the steering angle α of the right front wheel 10*f*R as shown in FIG. 1.

If the tread of the vehicle is represented by W and the wheel base is represented by L as shown in FIG. 1, the relationship between the steering angles α, β of the inner and outer wheels 10*f*R, 10*f*L is represented, from the Ackermann-Jeantaud relationship, by the following expression:

$$W/L = \cot\beta - \cot\alpha \tag{1}$$

When the right front wheel steering shaft 6*f*R rotates at an angular velocity $\theta_R$, if the gear ratio of the steering gear set 7*f*R is represented by $i_{fR}$, the steering angle velocity dα of the right front wheel 10*f*R (inner wheel in FIG. 1) is:

$$d\alpha = \theta_R / i_{fR} \tag{2}$$

From expressions (1) and (2), the steering angle velocity dβ of the left front wheel 10*f*L (outer wheel in FIG. 1) satisfying the Ackermann-Jeantaud relationship when the steering angle velocity of the right front wheel 10*f*R (inner wheel in FIG. 1) is dα. When the gear ratio of the left-front-wheel steering gear set 7*f*L is $i_{fL}$, the rotation angular velocity $\theta_{L2}$ of the left front wheel steering shaft 6*f*L can be obtained from the following expression:

$$\theta_{L2} = -d\beta \cdot i_{fL} \tag{3}$$

The minus sign on the right side of the above expression (3) signifies that the left front wheel steering shaft 6*f*L is caused to rotate in the opposite direction to the right front wheel steering shaft 6*f*R.

The rotation angular velocity $\theta_{cf}$ of the carrier 51*cf* is controlled by the steering angle adjustment motor 52*f* so that the rotation angular velocity $\theta_{L2}$ of the left front wheel steering shaft 6*f*L satisfies the above relationship, whereby the left and right front wheels 10*f*L, 10*f*R can be steered as shown in FIG. 1.

Figure 4B:
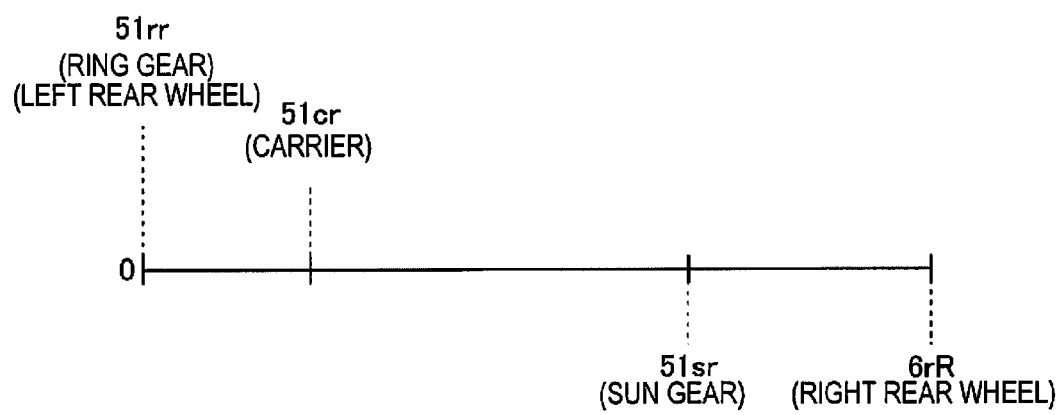

FIG. 4B is a nomogram showing the rotation speed relationship between the members in the differential gear set 5*r* in an instance in which the rear-wheel steering motor 3*r* and the steering angle adjustment motor 52*r* in FIG. 4A are maintained in a non-operating state and the left and right rear wheels 10*r*L, 10*r*R are not steered together as in FIG. 1.

In this instance, the left and right rear wheels 10*r*L, 10*r*R are not steered; therefore, the angular velocity of each of the rotation members in the differential gear set 5*r* is zero as shown in FIG. 4B.

Although not shown, it shall be apparent that a brake for immobilizing the left- and right-rear-wheel steering shafts 6*r*L, 6*r*R so as to be incapable of rotating may be provided for such an instance.

Figure 5:
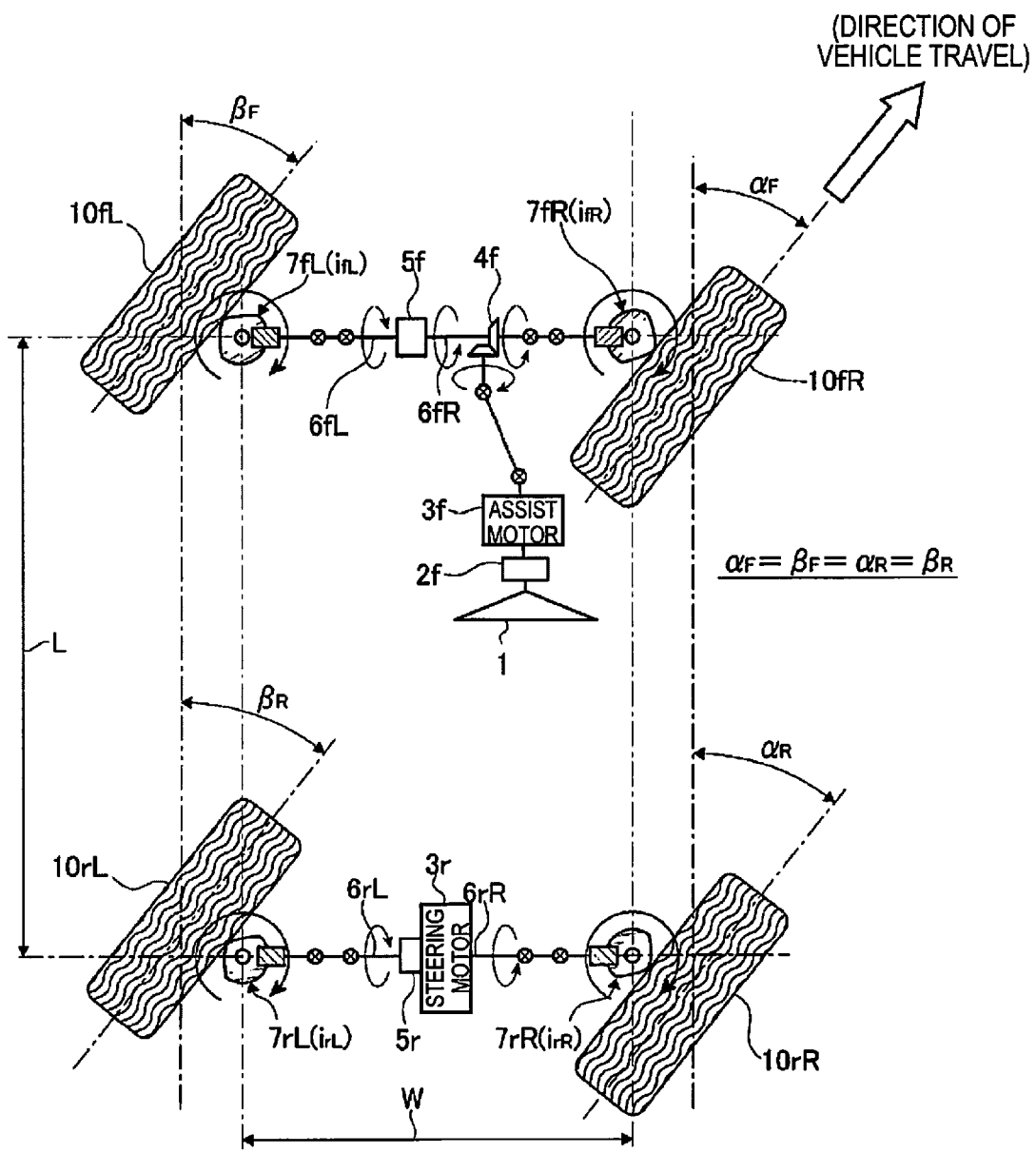
FIG. 5 is a schematic plan view in which front- and rear-wheel steering systems of an electric vehicle provided with the steering device representing the first embodiment of the present invention shown in FIG. 1 are shown for an instance in which a parallel movement maneuver mode, in which all of the left and right front wheels and the left and right rear wheels are similarly steered, whereby the vehicle moves in parallel, is enabled.
Figure 6A:
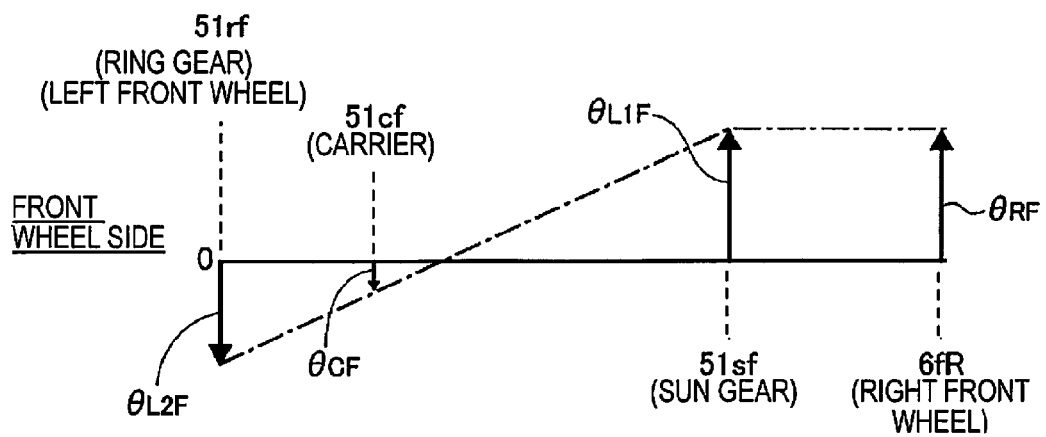
FIGS. 6A and 6B show nomograms showing the rotation speed relationship between members in the front-wheel steering angle adjustment differential gear set and the rotation speed relationship between members in the rear-wheel steering angle adjustment differential gear set when the parallel movement maneuver mode shown in FIG. 5 is enabled, where
Figure 6B:
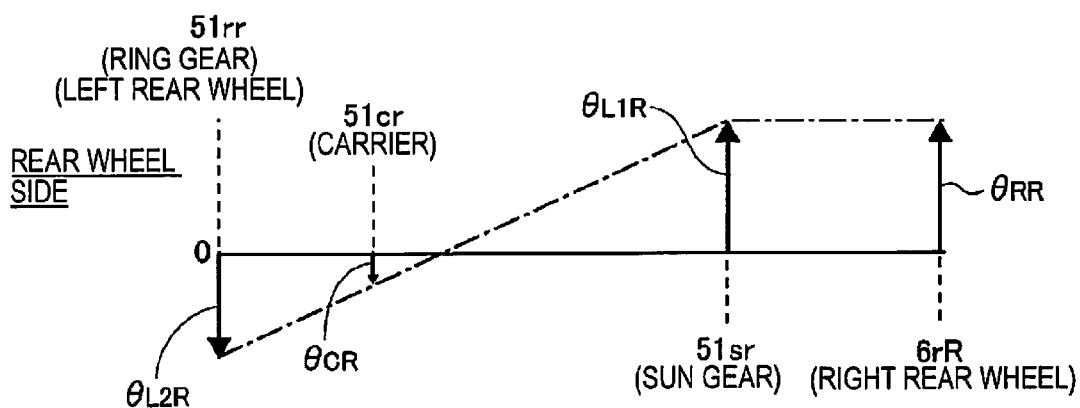
Figure 7:
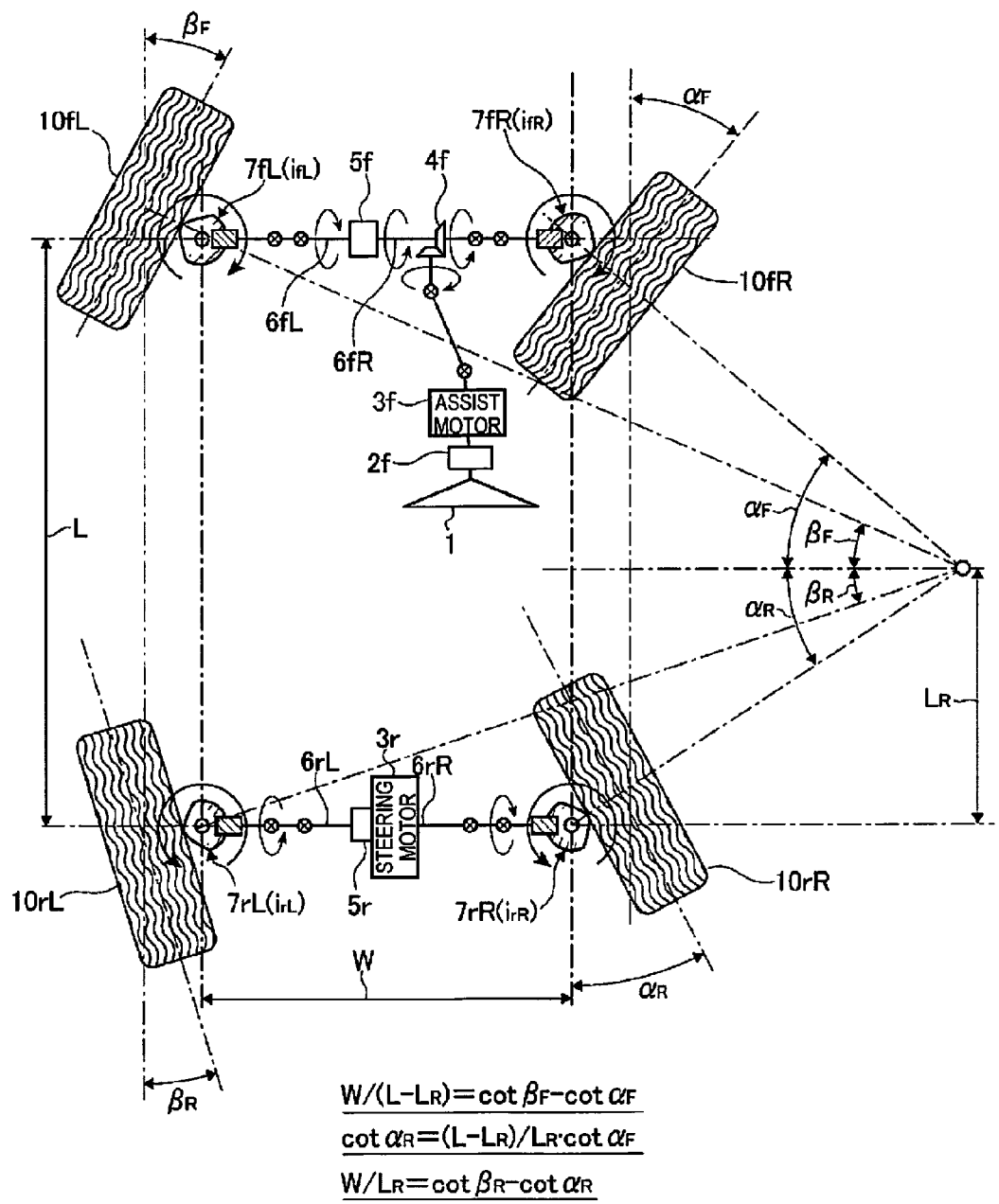
FIG. 7 is a schematic plan view in which front- and rear-wheel steering systems of an electric vehicle provided with the steering device representing the first embodiment of the present invention shown in FIG. 1 are shown for an instance in which a sharp-turn mode, in which the left and right front wheels and the left and right rear wheels are reverse-phase-steered and the vehicle is thereby caused to perform a sharp turn, is enabled.
Figure 8A:
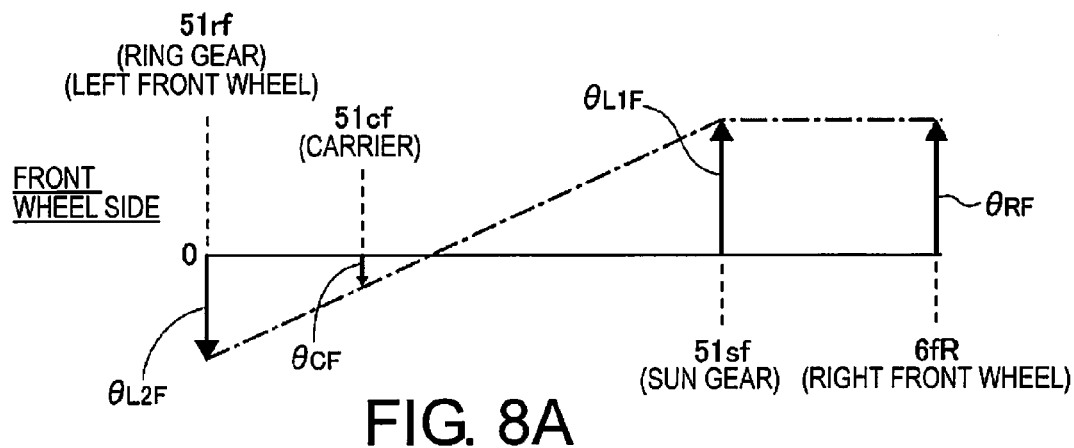
FIGS. 8A and 8B nomograms showing the rotation speed relationship between members in the front-wheel steering angle adjustment differential gear set and the rotation speed relationship between members in the rear-wheel steering angle adjustment differential gear set when the sharp-turn mode shown in FIG. 7 is enabled, where
Figure 8B:
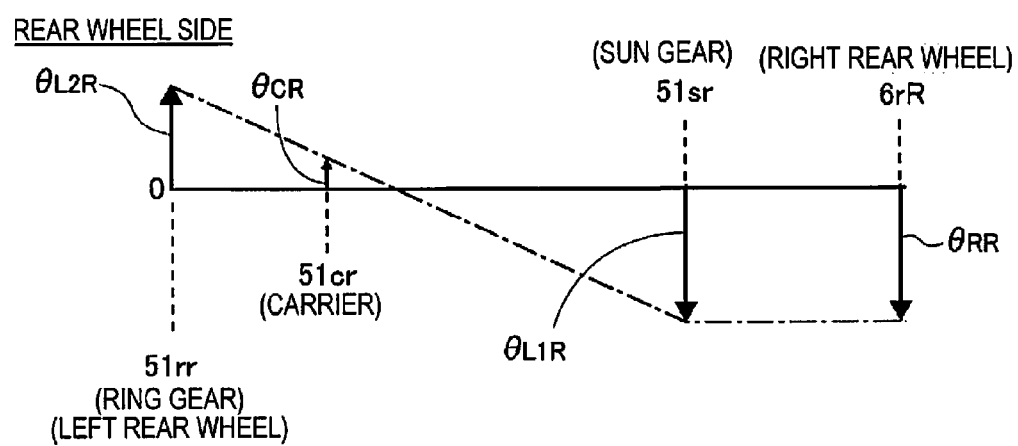
Figure 9:
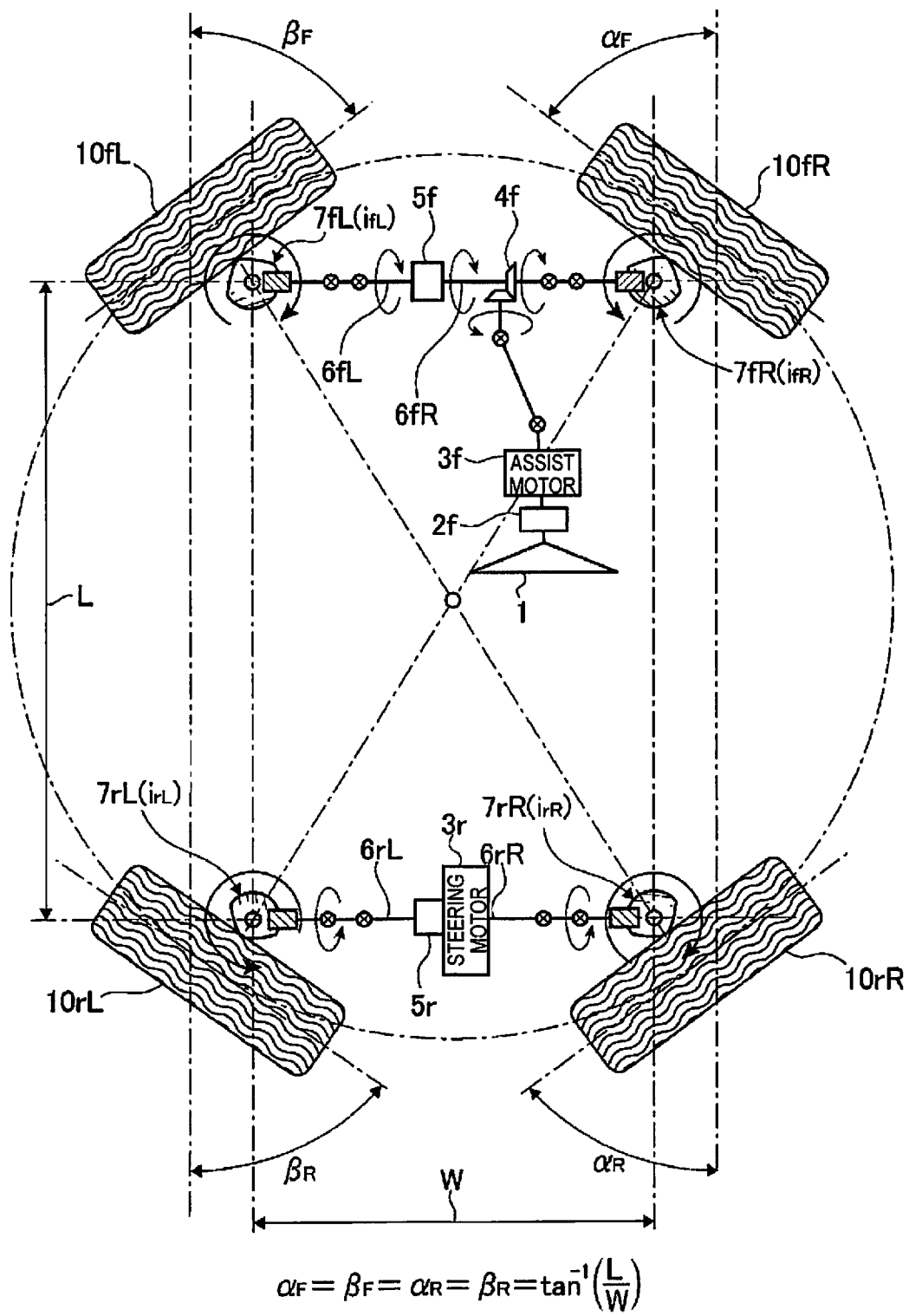
FIG. 9 is a schematic plan view in which front- and rear-wheel steering systems of an electric vehicle provided with the steering device representing the first embodiment of the present invention shown in FIG. 1 are shown for an instance in which a pivot-turn mode, in which the vehicle is turned at the present position, is enabled.
Figure 10A:
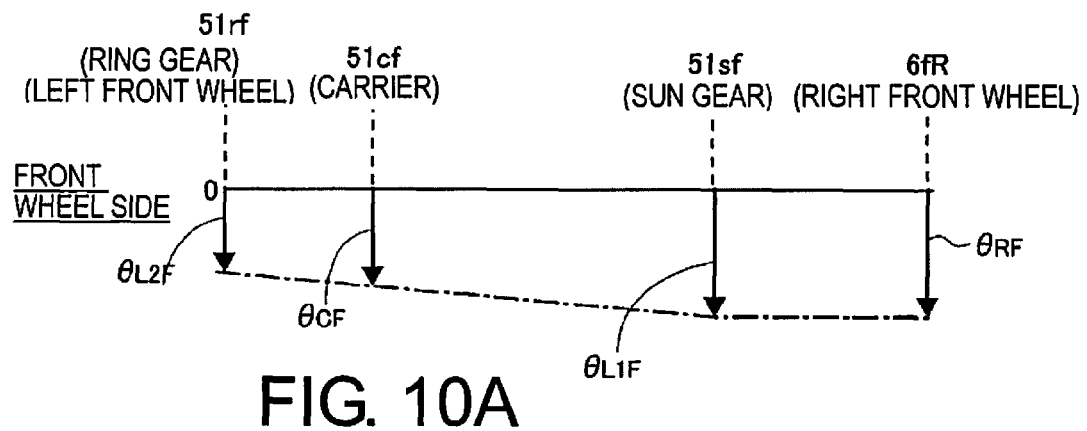
FIGS. 10A and 10B show nomograms showing the rotation speed relationship between members in the front-wheel steering angle adjustment differential gear set and the rotation speed relationship between members in the rear-wheel steering angle adjustment differential gear set when the pivot-turn mode shown in FIG. 9 is enabled, where
Figure 10B:
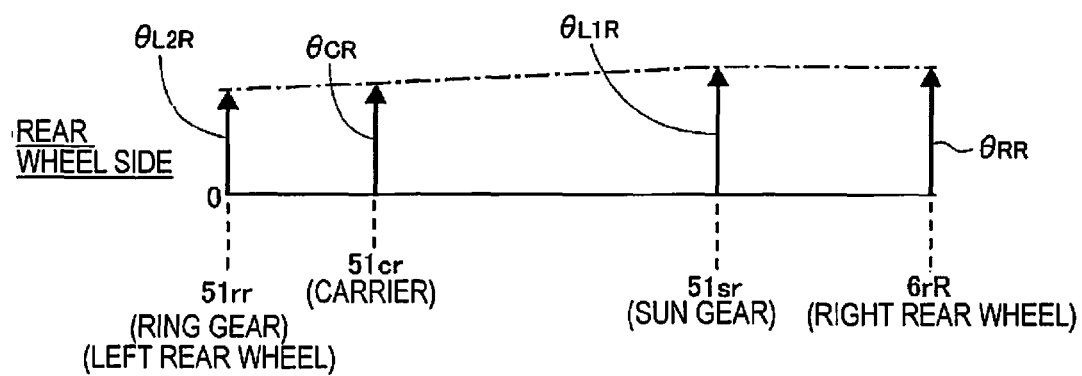

As is clear from the above description, the maneuver mode shown in FIG. 1 is a two-wheel maneuver mode through steering of the left and right front wheels 10*f*L, 10*f*R only. However, in the present embodiment, it is possible to select:

a parallel movement maneuver mode in which all of the left and right front wheels 10*f*L, 10*f*R and the left and right rear wheels 10*r*L, 10*r*R are similarly steered and the vehicle is moved in parallel in the direction in which all of the wheels are steered as shown in FIGS. 5, 6A and 6B;

a sharp turn mode in which the vehicle is made to perform a sharp turn by reverse-phase-steering the left and right front wheels 10*f*L, 10*f*R and the left and right rear wheels 10*r*L, 10*r*R as shown in FIGS. 7, 8A and 8B; or a pivot-turn (on-the-spot-turn) mode in which the vehicle is turned at the present position by steering the left and right front wheels 10*f*L, 10*f*R and the left and right rear wheels 10*r*L, 10*r*R as shown in FIGS. 9, 10A and 10B.

The parallel movement maneuver mode will now be described with reference to FIGS. 5, 6A and 6B.

As shown in FIG. 5, when the steering angle of the left and right front wheels 10*f*L, 10*f*R is $\beta_F$ and $\alpha_F$, respectively, and the steering angle of the left and right rear wheels 10*r*L, 10*r*R is $\beta_R$ and $\alpha_R$, respectively, in the parallel movement maneuver mode, the following relationship is true:

$$\alpha_F = \beta_F = \alpha_R = \beta_R \quad (4)$$

FIGS. 6A and 6B are nomograms showing the rotation speed relationship between the members in the front-wheel-side differential gear set 5*f* (single-pinion-type planetary gear set 51*f*) and the rotation speed relationship between the members in the rear-wheel-side differential gear set 5*r* (single-pinion-type planetary gear set 51*r*), respectively, in an instance of the parallel movement maneuver mode shown in FIG. 5.

The front wheel steering control in the parallel movement maneuver mode will now be described with reference to the nomogram in FIG. 6A.

When the right front wheel steering shaft 6*f*R rotates at an angular velocity of $\theta_{RF}$, and the gear ratio of the right front wheel steering gear set 7*f*R is represented by $i_{fR}$, the steering angular velocity $d\alpha_F$ of the right front wheel 10*f*R is represented by the following expression:

$$d\alpha_F = \theta_{RF} \cdot i_{fR} \quad (5)$$

The steering angular velocity $d\beta_F$ of the left front wheel 10*f*L is obtained from expressions (4) and (5). When the gear ratio of the left-front-wheel steering gear set 7*f*L is represented by $i_{fL}$, the rotation angular velocity $\theta_{L2F}$ of the left front wheel steering shaft 6*f*L is obtained from the following expression:

$$\theta_{L2F} = -d\beta_F \cdot i_{fL} \quad (6)$$

Controlling the rotation angular velocity $\theta_{cf}$ of the carrier 51*cf* using the steering angle adjustment motor 52*f* so that the rotation angular velocity $\theta_{L2F}$ of the left front wheel steering shaft 6*f*L satisfies the above relationship makes it possible to steer the left and right front wheels 10*f*L, 10*f*R as shown in FIG. 5.

The rear wheel steering control in the parallel movement maneuver mode will now be described with reference to the nomogram in FIG. 6B. When the gear ratio of the right rear wheel steering gear set 7*r*R is represented by $L_{rR}$, the angular velocity $\theta_{RR}$ of the right rear wheel steering shaft 6*r*R is represented by the following expression:

$$\theta_{RR} = d\alpha_R \cdot i_{rR} \quad (7)$$

Controlling the rotation speed of the rear-wheel steering motor 3*r* so that the angular velocity $\theta_{RR}$ of the right rear wheel steering shaft 6*r*R satisfies the above relationship makes it possible to steer the right rear wheel 10*r*R as shown in FIG. 5.

When the gear ratio of the left rear wheel steering gear set 7*r*L is represented by $i_{rL}$, the rotation angular velocity $\theta_{L2R}$ of the left rear wheel steering shaft 6*r*L is obtained from the following expression.

$$\theta_{L2R} = -d\beta_R \cdot i_{rL} \quad (8)$$

Controlling the rotation angular velocity $\theta_{CR}$ of the carrier 51*cr* using the steering angle adjustment motor 52*r* so that the $\theta_{L2R}$ of the left rear wheel steering shaft 6*r*L satisfies the above relationship makes it possible to steer the left rear wheel 10*r*L as shown in FIG. 5.

The sharp-turn mode will now be described with reference to FIGS. 7 and 8.

The sharp-turn mode shown in FIGS. 7, 8A and 8B is a mode in which the left and right front wheels 10*f*L, 10*f*R and the left and right rear wheels 10*r*L, 10*r*R are reverse-phase-steered so that the center of vehicle turn is positioned further forward from the extension line of the rear wheel axis by distance $L_R$ as shown in FIG. 7, whereby the vehicle is made to perform a sharp turn.

From the Ackermann-Jeantaud relationship, the right front wheel steering angle $\alpha_F$, the left-front-wheel steering angle $\beta_F$, the right rear wheel steering angle $\alpha_R$, and the left rear wheel steering angle $\beta_R$ are represented by the following expressions:

$$W/(L-L_R) = \cot \beta_F - \cot \alpha_F \quad (9)$$

$$\cot \alpha_R = ((L-L_R)/L_R) \cdot \cot \alpha_F \quad (10)$$

$$W/L_R = \cot \beta_R - \cot \alpha_R \quad (11)$$

FIGS. 8A and 8B are nomograms showing the rotation speed relationship between the members in the front-wheel-side differential gear set 5*f* (single-pinion-type planetary gear set 51*f*) and the rotation speed relationship between the members in the rear-wheel-side differential gear set 5*r* (single-pinion-type planetary gear set 51*r*), respectively, in an instance of the sharp-turn mode shown in FIG. 7.

The front wheel steering control in the sharp-turn mode will now be described with reference to the nomogram in FIG. 8A. When the right front wheel steering shaft 6*f*R rotates at an angular velocity of $\theta_{RF}$, and the gear ratio of the right front wheel steering gear set 7*f*R is represented by $i_{fR}$, the steering angular velocity $d\alpha_F$ of the right front wheel 10*f*R is represented by the following expression:

$$d\alpha_F = \theta_{RF} \cdot i_{fR} \quad (12)$$

The steering angular velocity $d\beta_F$ of the left front wheel 10*f*L is obtained from expressions (9) and (12). When the gear ratio of the left-front-wheel steering gear set 7*f*L is represented by $i_{fL}$, the rotation angular velocity $\theta_{L2F}$ of the left front wheel steering shaft 6*f*L is obtained from the following expression:

$$\theta_{L2F} = -d\beta_F \cdot i_{fL} \quad (13)$$

Controlling the rotation angular velocity $\theta_{cf}$ of the carrier 51*cf* using the steering angle adjustment motor 52*f* so that the rotation angular velocity $\theta_{L2F}$ of the left front wheel steering shaft 6*f*L satisfies the above relationship makes it possible to steer the left and right front wheels 10*f*L, 10*f*R as shown in FIG. 7.

The rear wheel steering control in the sharp-turn mode will now be described with reference to the nomogram in FIG. 8B. The steering angular velocity $d\alpha_R$ of the right rear wheel 10*r*R is obtained from expressions (10) and (12). When the gear ratio of the right rear wheel steering gear set 7*r*R is represented by $i_{rR}$, the angular velocity $\theta_{RR}$ of the right rear wheel steering shaft 6rR is represented by the following expression:

$$\theta_{RR} = -d\alpha_R \cdot i_{rR} \quad (14)$$

Controlling the rotation speed of the rear-wheel steering motor 3r so that the angular velocity $\theta_{RR}$ of the right rear wheel steering shaft 6rR satisfies the above relationship makes it possible to steer the right rear wheel 10rR as shown in FIG. 7.

Meanwhile, the steering angular velocity $\theta_{CR}$ of the left rear wheel 10rL is obtained from expression (12). When the gear ratio of the left rear wheel steering gear set 7rL is represented by $i_{rL}$, the rotation angular velocity $\theta_{L2R}$ of the left rear wheel steering shaft 6rL is obtained from the following expression:

$$\theta_{L2R} = d\beta_R \cdot i_{rL} \quad (15)$$

Controlling the rotation angular velocity $\theta_{CR}$ of the carrier 51cr using the steering angle adjustment motor 52r so that the $\theta_{L2R}$ of the left rear wheel steering shaft 6rL satisfies the above relationship makes it possible to steer the left rear wheel 10rL as shown in FIG. 7.

The pivot-turn (on-the-spot-turn) mode will now be described with reference to FIGS. 9, 10A and 10B.

The pivot-turn mode shown in FIGS. 9, 10A and 10B is a maneuver mode in which, as shown in FIG. 9, the vehicle is caused to turn on the spot about a point at the center of the vehicle body in top view. The pivot-turn mode can be achieved by steering the left and right front wheels 10fL, 10fR and the left and right rear wheels 10rL, 10rR so that the respective rotational axes pass through the point at the center of the vehicle body as shown in FIG. 9.

From the Ackermann-Jeantaud relationship, the right-front-wheel steering angle $\alpha_F$, the left-front-wheel steering angle $\beta_F$, the right rear wheel steering angle $\alpha_R$, and the left rear wheel steering angle $\beta_R$ shown in FIG. 9 are represented by the following expression:

$$\alpha_F = \beta_F = \alpha_R = \theta_R = \tan^{-1}(L/W) \quad (16)$$

In other words, each of the right front wheel steering angle $\alpha_F$, the left-front-wheel steering angle $\beta_F$, the right rear wheel steering angle $\alpha_R$, and the left rear wheel steering angle $\beta_R$ is univocally determined from the tread W and the wheel base L.

FIGS. 10A and 10B are nomograms showing the rotation speed relationship between the members in the front-wheel-side differential gear set 5f (single-pinion-type planetary gear set 51f) and the rotation speed relationship between the members in the rear-wheel-side differential gear set 5r (single-pinion-type planetary gear set 51r), respectively, in an instance of the pivot-turn mode shown in FIG. 9.

The front wheel steering control in the pivot-turn mode will now be described with reference to the nomogram in FIG. 10A. When the right front wheel steering shaft 6fR rotates at an angular velocity of $\theta_{RF}$, and the gear ratio of the right front wheel steering gear set 7fR is represented by $i_{fR}$, the steering angular velocity $d\alpha_F$ of the right front wheel 10fR is represented by the following expression:

$$d\alpha_F = \theta_{RF} / i_{fR} \quad (17)$$

Here, it is necessary to steer the left front wheel 10fL at the same steering speed as the steering angular velocity $d\alpha_F$ of the right front wheel 10fR, but in the opposite direction.

Therefore, the left front steering shaft 6fL is caused to rotate in the same direction as the right front wheel steering shaft 6fR.

When the gear ratio of the left-front-wheel steering gear set 7fL is represented by $i_{fL}$, the rotation angular velocity $\theta_{L2F}$ of the left front wheel steering shaft 6fL is obtained from the following expression.

$$\theta_{L2F} = d\beta_F \cdot i_{fL} \quad (18)$$

Controlling the rotation angular velocity $\theta_{cf}$ of the carrier 51cf using the steering angle adjustment motor 52f so that the rotation angular velocity $\theta_{L2F}$ of the left front wheel steering shaft 6fL satisfies the above relationship makes it possible to steer the left and right front wheels 10fL, 10fR as shown in FIG. 9.

The rear wheel steering control in the pivot-turn mode will now be described with reference to the nomogram in FIG. 10B.

The left and right front wheels 10fL, 10fR are steered at the same steering speed and in the opposite steering direction as the side of the left and right rear wheels 10rL, 10rR. Therefore, when the gear ratio of the right rear wheel steering gear set 7rR is represented by $i_{rR}$, the angular velocity $\theta_{RR}$ of the right rear wheel steering shaft 6rR is represented by the following expression:

$$\theta_{RR} = d\alpha_R \cdot i_{rR} \quad (19)$$

Controlling the rotation speed of the rear-wheel steering motor 3r so that the angular velocity $\theta_{RR}$ of the right rear wheel steering shaft 6rR satisfies the above relationship makes it possible to steer the right rear wheel 10rR as shown in FIG. 9.

Meanwhile, when the gear ratio of the left rear wheel steering gear set 7rL is represented by $i_{rL}$, the rotation angular velocity $\theta_{L2R}$ of the left rear wheel steering shaft 6rL is obtained from the following expression:

$$\theta_{L2R} = d\beta_R \cdot i_{rL} \quad (20)$$

Controlling the rotation angular velocity $\theta_{CR}$ of the carrier 51cr using the steering angle adjustment motor 52r so that the $\theta_{L2R}$ of the left rear wheel steering shaft 6rL satisfies the above relationship makes it possible to steer the left rear wheel 10rL as shown in FIG. 9.

<Effect>

In the steering device according to the first embodiment described above, a configuration is present so that the rotation ratio can be changed between the left- and right-front-wheel steering shafts 6fL, 6fR using the steering angle adjustment motor 52f through the corresponding differential gear set 5f, and the rotation ratio can be changed between the left- and right-rear-wheel steering shafts 6rL, 6rR using the rear-wheel steering angle adjustment motor 52r through the corresponding differential gear set 5r. Therefore, as described above with reference to FIGS. 1 to 9, it is possible to steer the left and right front wheels 10fL, 10fR and the left and right rear wheels 10rL, 10rR in a manner in which the center of vehicle turn can be set to an arbitrary position while satisfying the Ackermann-Jeantaud relationship, and to achieve a variety of maneuver modes without the problems of uneven wear and squealing of the wheel tires being generated.

In order to achieve the above, it is preferable to build a steering system provided with a maneuver mode selection means or unit (not shown) for the driver to select the maneuver mode for the vehicle automatically or by manual operation, a steering operation detection means or device 2f (see FIG. 1) for detecting the amount and speed of the steering operation, and a steering angle detection means (not shown) for detecting the steering angles of the left and right front wheels 10fL, 10fR and the left and right rear wheels 10rL, 10rR (not shown), in which an actuator control means or device (not shown) controls, on the basis of signals from the above means, the steering angle adjustment motor 52f and the steering angle adjustment motor 52r so as to achieve the selected maneuver mode while satisfying the Ackermann-Jeantaud relationship.

If the wheels are to be individually steered using an actuator such as a motor provided to each of the wheels to achieve the desired maneuver mode, a problem will be presented in that a complex steering control involving synchronizing each of the wheels becomes necessary, and there will need to be as many of the costly actuators as there are wheels, so that structural as well as control-related issues will contribute to increased cost. In addition, a problem is also presented in that because the steering systems for each of the wheels are not mechanically linked, a fail-safe measure to prepare for a malfunction in the control system for the steering device becomes necessary, again increasing the cost.

However, the above steering device of the present embodiment is completely free of such problems, and beneficial in terms of cost as well as in terms of safety.

Embodiment Two

<Configuration>

Figure 11A:
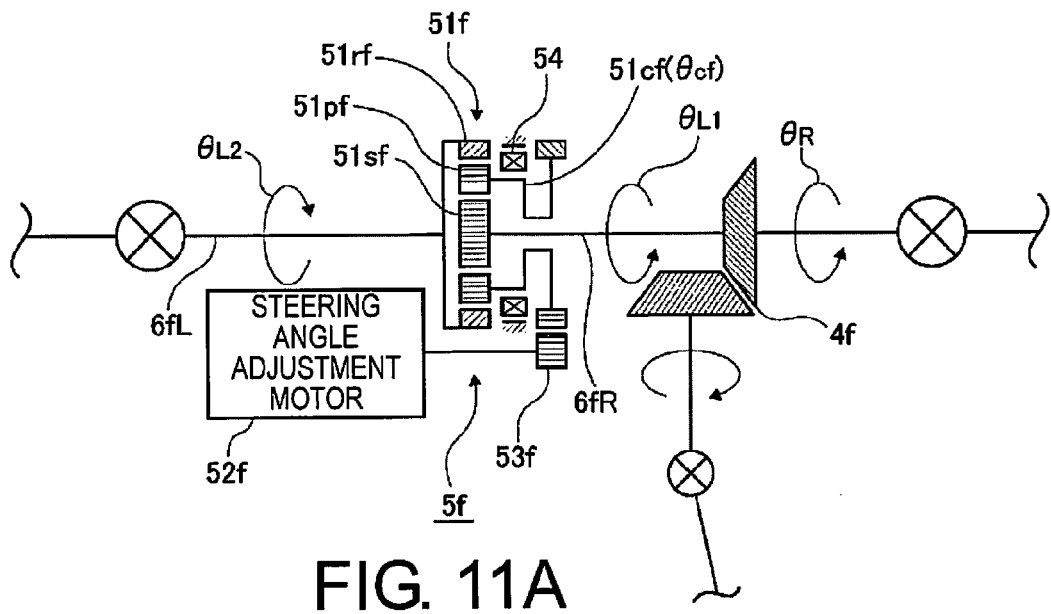
FIGS. 11A and 11B show the front-wheel steering system in a steering device representing a second embodiment of the present invention, where

FIG. 11A is a detailed drawing, similar to FIG. 3A, showing a steering angle adjustment differential gear set 5f of a front wheel steering system in a steering device representing a second embodiment of the present invention.

The present embodiment is configured so that a lock mechanism 54 enabling two-directional braking is provided to the differential gear set 5f so that the carrier 51cf of the differential gear set 5f can be immobilized in both rotation directions.

The steering device for the vehicle has otherwise a similar configuration as that described above with reference to FIG. 1.

In the present embodiment, in the two-wheel maneuver mode shown in FIG. 1 in which only the left and right front wheels 10fL, 10fR are steered, the above lock mechanism 54 is operated and the carrier 51cf of the differential gear set 5f is immobilized in both rotation directions.

Figure 11B:
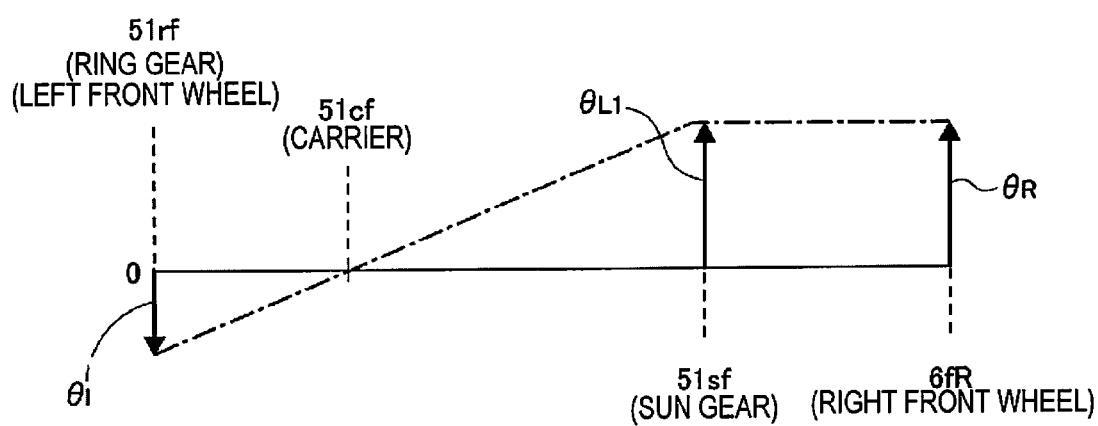

The rotation speed relationship between the rotation members in the differential gear set 5f at this time is shown in FIG. 11B.

Because the carrier 51cf is locked by the lock mechanism 54, the rotation of the carrier 51cf is zero as shown in FIG. 11B.

Therefore, the steering angle adjustment motor 52f does not function, and in order for the steering angle relationship between the left and right front wheels 10fL, 10fR to satisfy the aforementioned Ackermann-Jeantaud relationship represented in expression (1), it is necessary that the gear ratio (speed ratio) between the left- and right-front-wheel steering gear sets 7fL, 7fR be a variable speed ratio.

Figure 12:
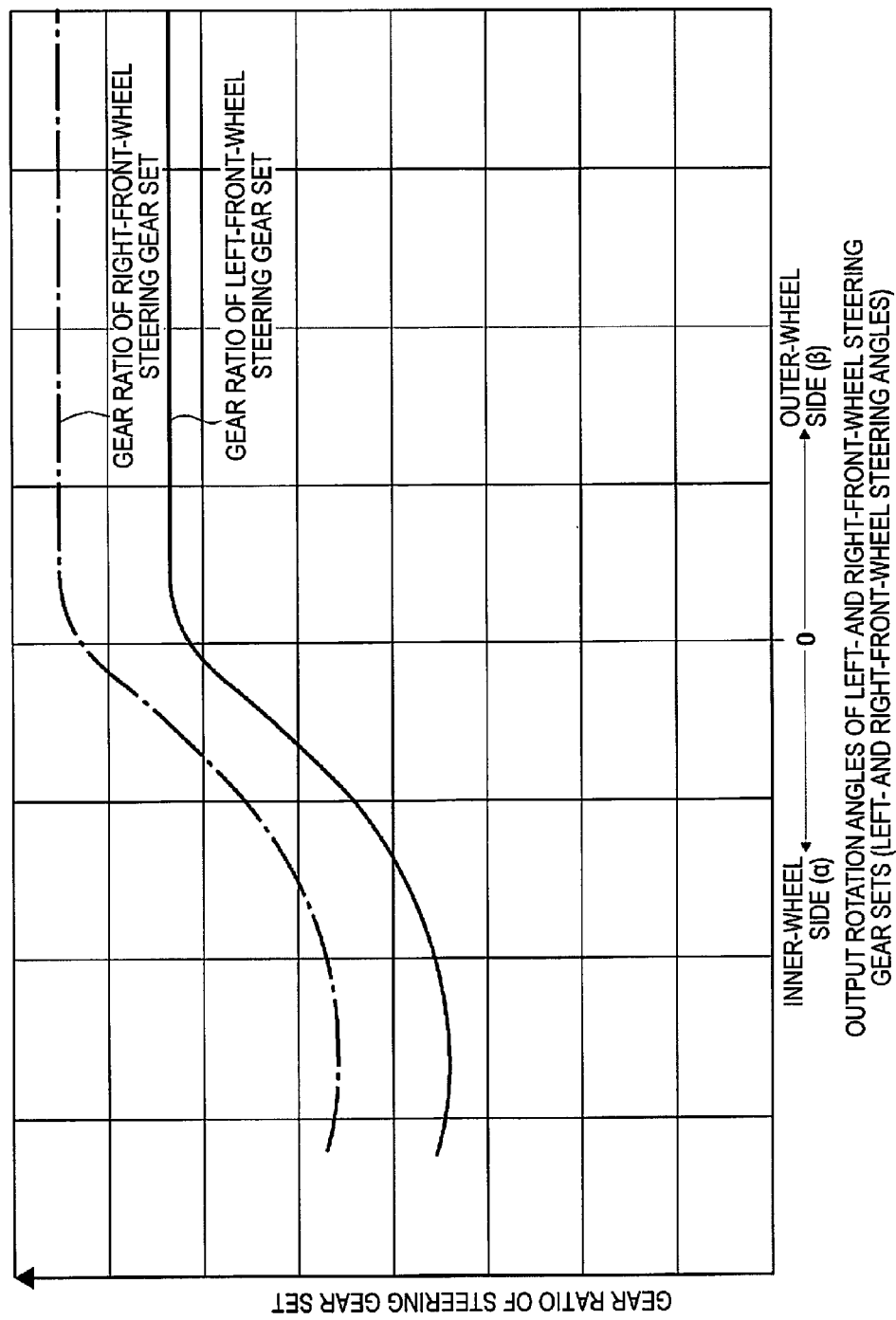
FIG. 12 is a gear ratio change characteristic diagram showing how the gear ratios of the left- and right-front-wheel steering gear sets in the steering device representing the second embodiment change with the left- and right-front-wheel steering angles.

In order to achieve the above, in the present embodiment, a variable speed ratio gear set having the gear ratio change characteristics shown in FIG. 12 is used for each of the left- and right-front-wheel steering gear sets 7fL, 7fR.

FIG. 12 shows the gear ratio change characteristics of the left- and right-front-wheel steering gear sets 7fL, 7fR relative to the output-side rotation angle of the left- and right-front-wheel steering gear sets 7fL, 71R, i.e., the left and right-front-wheel steering angle.

In the present embodiment, a variable speed ratio is used such that from amongst the left- and right-front-wheel steering gear sets 7fL, 7fR, the steering gear set 7fR or 7fL on the outer-wheel side has a constant gear ratio and the steering gear set 7fR or 7fL on the inner-wheel side has a gear ratio satisfying expression (1).

As shown in FIG. 11B, when the teeth number ratio (i.e., the number of sun gear teeth/number of ring gear teeth) of the single-pinion-type planetary gear set 51f is represented by λ, the input rotation angles for the left- and right-front-wheel steering gear sets 7fL, 71R, i.e., the rotation angles $\theta_{L2}$, $\theta_{L1}$ ($\theta_R$) of the left- and right-front-wheel steering shafts 6fL, 6fR have a relationship:

$$\theta_{L2} = -\lambda \cdot \theta_R \quad (21).$$

Therefore, the gear ratios $\{i_{fR}(\theta_R)\}$, $\{i_{fL}(\theta_{L2})\}$ of the left- and right-front-wheel steering gear sets 7fL, 7fR must satisfy the relationship:

$$i_{fL}(\theta_{L2}) = \lambda \cdot i_{fR}(\theta_R) \quad (22).$$

Figure 13:
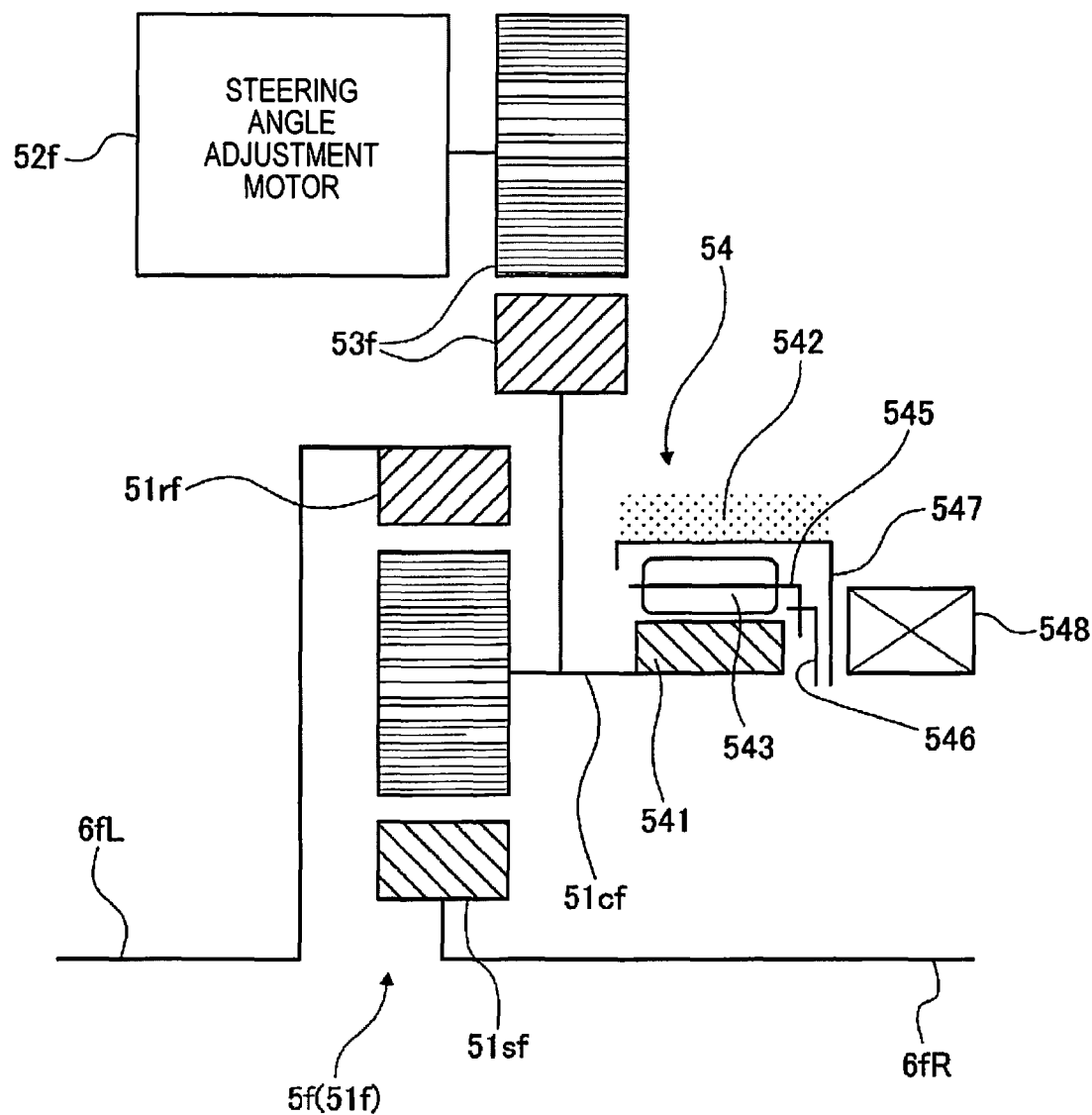
FIG. 13 is an outline diagram schematically showing, in detail, a lock mechanism of the front-wheel steering angle adjustment differential gear set shown in FIG. 11A.
Figure 14:
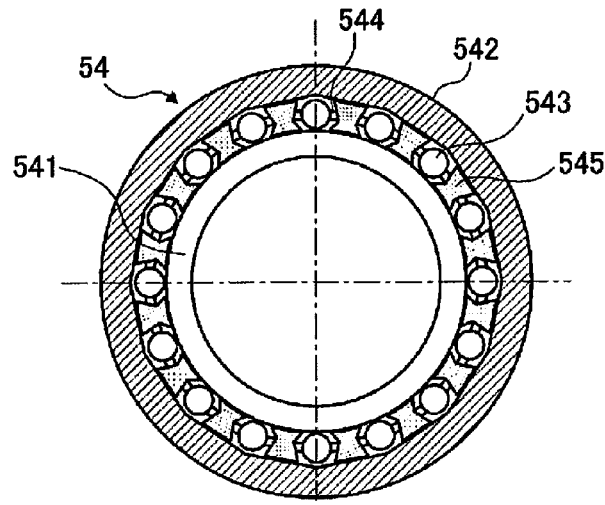
FIG. 14 is a vertical cross-section front view showing the lock mechanism of the front-wheel steering angle adjustment differential gear set shown in detail in FIG. 13.

The lock mechanism 54 described above can be configured as shown, e.g., in FIGS. 13 and 14.

FIG. 13 is a schematic side view showing the lock mechanism 54 embedded into the front-wheel differential gear set 5f (single-pinion-type planetary gear set 510, and FIG. 14 is a vertical cross-section front view of the lock mechanism 54.

An inner ring 541 of the lock mechanism (two-directional brake) 54 is coupled to the carrier 51cf of the front-wheel differential gear set 5f (single-pinion-type planetary gear set 510.

An outer ring 542 of the lock mechanism (two-directional brake) 54 is fixed to a case of the front-wheel differential gear set 5f (single-pinion-type planetary gear set 51f).

An inner circumferential rolling surface of the outer ring 542 is shaped as a regular polygon so as to function as a cam surface, and a plurality of rollers 543 are interposed between the inner circumferential rolling surface of the outer ring 542 and an outer circumferential surface of the inner ring 541.

The rollers 543 are held at regular intervals along the circumferential direction between the inner and outer circumferential cam surfaces by a spring 544 and a holder 545.

An electromagnet 548 is provided in the axial direction of the holder 545 so as to face the holder 545. The electromagnet 548, when not energized, allows the holder 545 to rotate, and when energized, suctions an armature 546 integral with the holder 545 to an outer ring plate 547 and thereby immobilizes the holder 545 at a center position.

While the electromagnet 548 is not energized and the holder 545 is capable of rotating, the holder 545 is able to rotate with the carrier 51cf, the gap between the inner and outer circumferential cam surfaces and the rollers 543 is eliminated, and the carrier 51cf is locked with regards to both rotational directions.

While the electromagnet 548 is energized and the holder 545 is immobilized at the center position, a gap is present between the inner and outer cam surfaces and the rollers 543, and the carrier 51cf is capable of rotating in either direction.

The lock mechanism (two-directional brake) 54 may also be conversely configured so that the holder 545 is able to rotate when the electromagnet 548 is energized and the holder 545 is immobilized at the center position when the electromagnet 548 is not energized.

<Effect>

In the steering device of the second embodiment described above, a configuration is present so that the carrier 51cf of the differential gear set 5f can be immobilized using the lock mechanism 54 so that, in the two-wheel maneuver mode in which only the left and right front wheels 10fL, 10fR are steered, the lock mechanism 54 can be operated to immobilize the carrier 51cf of the differential gear set 5f, whereby the two-wheel maneuver mode can be realized while satisfying the Ackermann-Jeantaud relationship without relying on operation of the steering angle adjustment motor 52f.

Embodiment Three

<Configuration>

Figure 15A:
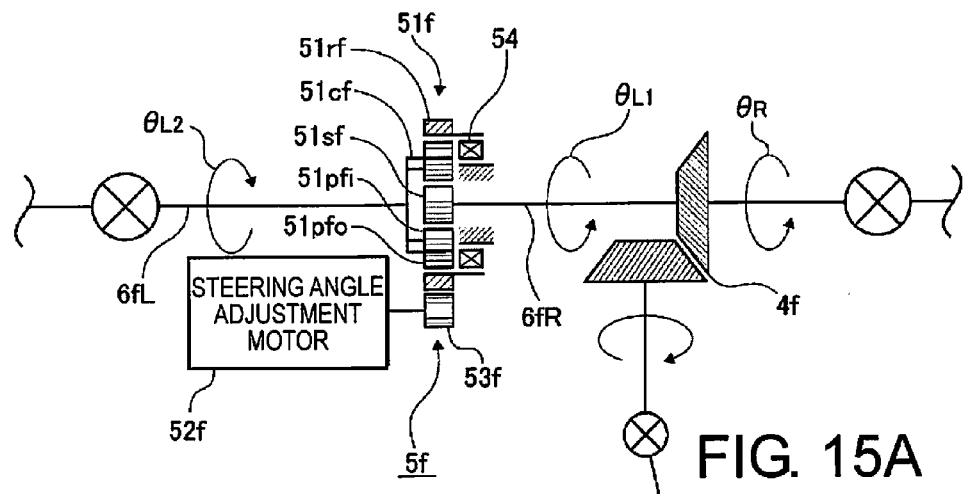
FIGS. 15A and 15B show the front-wheel steering system in a steering device representing a third embodiment of the present invention, where

FIG. 15A is a detailed drawing, similar to FIG. 3A, showing a steering angle adjustment differential gear set 5f of a front wheel steering system in a steering device representing a third embodiment of the present invention.

In the present embodiment, the differential gear set 5f comprises a planetary gear set 51f, and a double-pinion planetary gear set is used as the planetary gear set 51f.

The double-pinion planetary gear set is one in which the aforementioned pinion 51pf is replaced by a double pinion 51pfi, 51pfo engaging with each other. An inside pinion 51pfi is engaged with the sun gear 51sf, and an outside pinion 51pfo is engaged with the ring gear 51rf.

The sun gear 51sf is coupled to the inner end of the right front wheel steering shaft 6fR, as with the aforementioned embodiments. However, in the present embodiment, the carrier 51cf of the double pinion 51pfi, 51pfo is coupled to the left front wheel steering shaft 6fL.

The steering angle adjustment motor 52f is drivably coupled to the ring gear 51rf through the reduction gear 53f.

A lock mechanism 54 enabling two-directional braking is provided to the differential gear set 5f so that a configuration is present in which the ring gear 51rf of the differential gear set 5f can be immobilized in both rotation directions.

In the present embodiment, the lock mechanism 54 is capable of locking the rotation of the ring gear 51rf as appropriate through the same principal as that described above with reference to FIGS. 13 and 14.

In order to achieve the above, the outer ring of the lock mechanism 54 is coupled to the ring gear 51rf and the inner ring is fixed to the case of the differential gear set 5f.

The steering device for the vehicle has otherwise the same configuration as that described above with reference to FIG. 1.

In the present embodiment, in the two-wheel maneuver mode shown in FIG. 1 in which only the left and right front wheels 10fL, 10fR are steered, the abovementioned lock mechanism 54 is operated and the ring gear 51rf of the differential gear set 5f is immobilized in both rotation directions.

The arrows shown in FIG. 15A are directions of rotation of the respective axes when the front wheels are steered to the right.

Figure 15B:
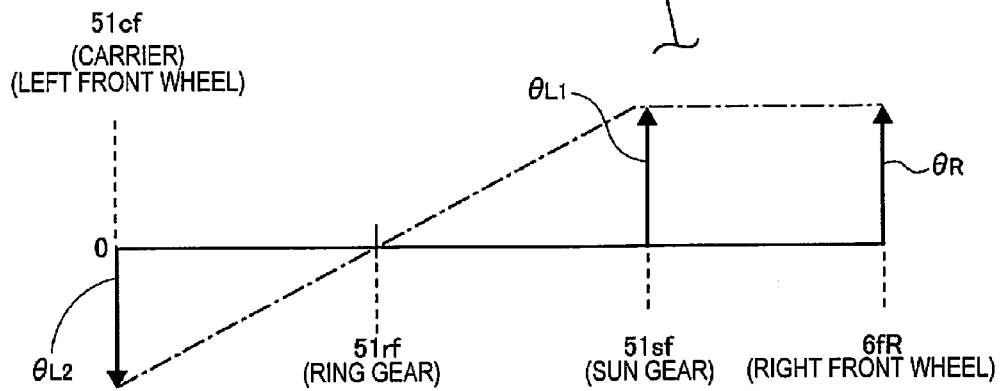

The rotation speed relationship between the rotation members in the differential gear set 5f when the lock mechanism 54 is operating (i.e., when the ring gear 51rf is immobilized) is shown in FIG. 15B.

Because the ring gear 51rf is immobilized by the lock mechanism 54, the rotation of the ring gear 51rf is zero as shown in FIG. 15B.

Therefore, the steering angle adjustment motor 52f does not function, and in order for the steering angle relationship between the left and right front wheels 10fL, 10fR to satisfy the aforementioned Ackermann-Jeantaud relationship represented in expression (1), it is necessary that the gear ratio (speed ratio) between the left- and right-front-wheel steering gear sets 7fL, 7fR be a variable speed ratio.

<Effect>

In the present embodiment, the steering angle adjustment differential gear set 5f for the front wheel steering system comprises the double-pinion planetary gear set 51f, the teeth number ratio λ (number of sun gear teeth/number of ring gear teeth) thereof can readily be made to approximate 0.5.

Therefore, the rotation angles $\theta_{L2}$, $\theta_{L1}$ ($\theta_R$) of the left- and right-front-wheel steering shafts 6fL, 6fR can be made even, and the gear ratios $\{i_{fR}(\theta_R)\}$, $\{i_{fL}(\theta_{L2})\}$ of the front wheel steering gear sets 7fL, 7fR can also be made even.

It follows that setting the double-pinion planetary gear set 51f so that the teeth number ratio λ thereof is 0.5 makes it possible to equalize the rotation angles $\theta_{L2}$, $\theta_{L1}$ ($\theta_R$) of the left- and right-front-wheel steering shafts 6fL, 61R and equalize the gear ratios $\{i_{fR}(\theta_R)\}$, $\{i_{fL}(\theta_{L2})\}$ of the front wheel steering gear sets 7fL, 7fR.

The front wheel steering gear sets 7fL, 7fR can thereby be made more compact, allowing the size of the steering device to be reduced.

Embodiment Four

<Configuration>

Figure 16:
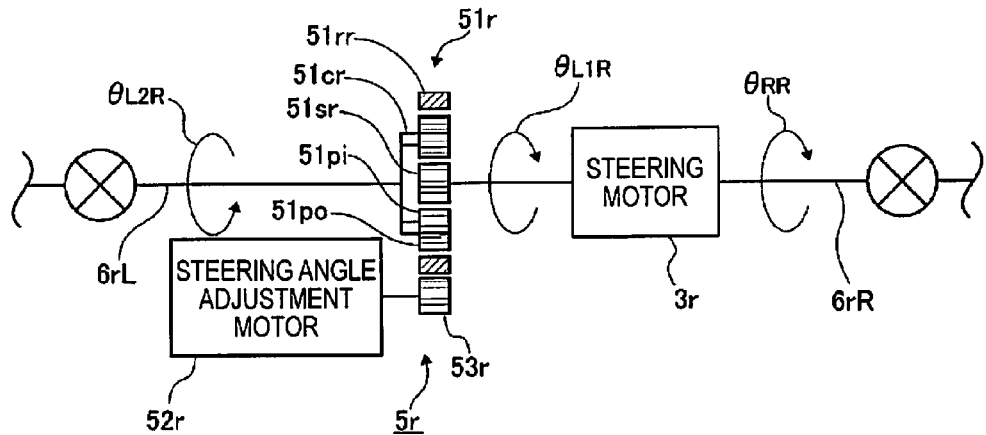
FIG. 16 is outline diagram schematically showing the main parts of the rear-wheel steering system including the rear-wheel steering angle adjustment differential gear set in the steering device representing a fourth embodiment of the present invention.

FIG. 16 is a detailed drawing, similar to FIG. 4A, showing a rear wheel steering system of the steering device according to a fourth embodiment of the present invention.

In the present embodiment, the steering angle adjustment differential gear set 5r of the rear wheel steering system comprises a planetary gear set 51r, and a double-pinion planetary gear set is used as the planetary gear set 51r.

The double-pinion planetary gear set is one in which the aforementioned pinion 51pr is replaced by a double pinion 51pri, 51pro engaging with each other. An inside pinion 51pri is engaged with the sun gear 51sr, and an outside pinion 51pro is engaged with the ring gear 51rr The sun gear 51sr is coupled to the inner end of the right rear wheel steering shaft 6rR, as with the aforementioned embodiments. However, in the present embodiment, the carrier 51cr of the double pinion 51pri, 51pro is coupled to the left rear wheel steering shaft 6rL.

The steering angle adjustment motor 52r is drivably coupled to the ring gear 51rr through the reduction gear 53r.

In the present embodiment, the steering angle adjustment differential gear set 5f of the front wheel steering system comprises a double-pinion planetary gear set 51f, as with the instance of the aforementioned third embodiment described above with reference to FIG. 15A.

However, the lock mechanism 54 in FIG. 15A is not always required. The following description is given on the assumption that the lock mechanism 54 is in a non-operating state and the ring gear 51rf is not locked.

<Operation>

The operation of the steering device representing the fourth embodiment above will now be described for each of the maneuver modes with reference to FIGS. 17 to 19.

(a) Parallel Movement Maneuver Mode

Figure 17A:
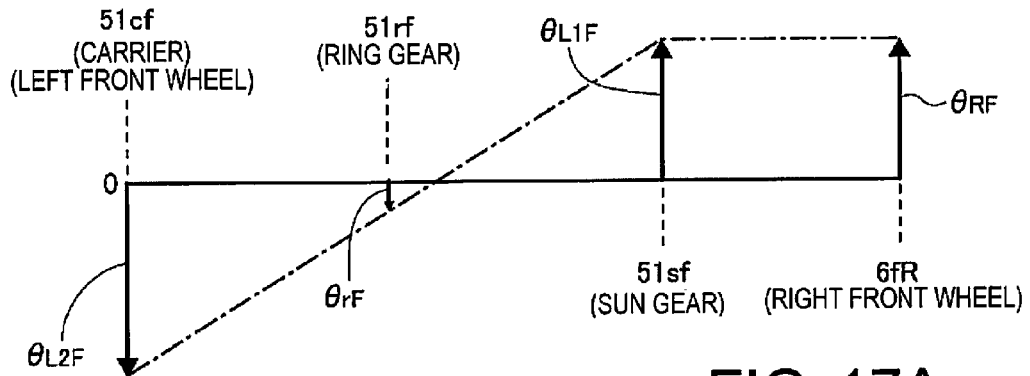
FIGS. 17A and 17B show nomograms for the front-wheel steering angle adjustment differential gear set and the rear-wheel steering angle adjustment differential gear set of the steering device representing the fourth embodiment of the present invention provided with the rear-wheel steering system shown in FIG. 16 when the parallel movement maneuver mode is enabled, where
Figure 17B:
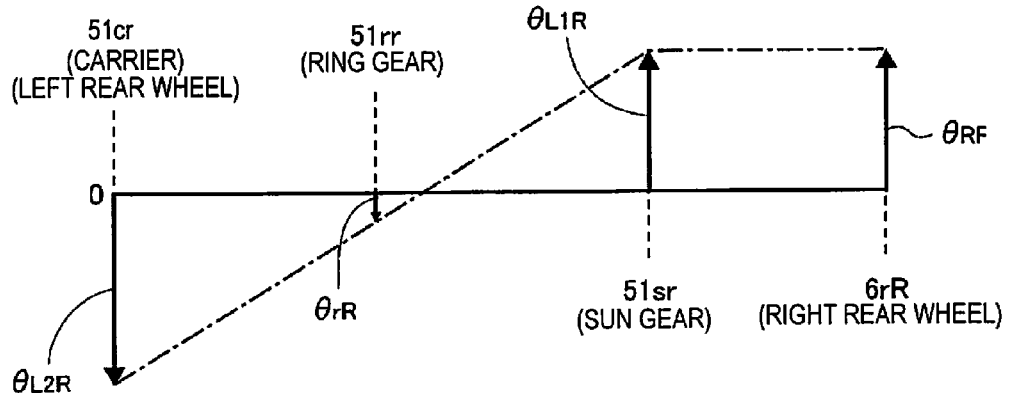

FIGS. 17A, 17B are nomograms showing the rotation speed relationship between the members in the front-wheel-side differential gear set 5f (double-pinion planetary gear set 51f shown in FIGS. 15A and 15B) and the rotation speed relationship between the members in the rear-wheel-side differential gear set 5r (double-pinion planetary gear set 51r shown in FIG. 16), respectively, in the parallel movement maneuver mode in which all of the left and right front wheels 10fL, 10fR and the left and right rear wheels 10rL, 10rR are similarly steered and the vehicle is moved in parallel in the direction in which all of the wheels are steered as shown in FIG. 5.

As with the instances in which each of the front-wheel-side differential gear set 5f and the rear-wheel-side differential gear set 5r comprises a single-pinion-type planetary gear set, the rotation of each of the steering angle adjustment motors 52f, 52r is controlled so that the aforementioned expression (4) is satisfied.

The single-pinion-type planetary gear set shown in FIG. 4A may also be used as the rear-wheel-side differential gear set 5r.

The rotation of each of the steering angle adjustment motors 52f, 52r being controlled as described above results in the nomogram for the front-wheel-side differential gear set 5f shown in FIG. 17A and the nomogram for the rear-wheel-side differential gear set 5r shown in FIG. 17B being completely identical, and it being possible to steer all of the left and right front wheels 10fL, 10fR and the left and right rear wheels 10rL, 10rR in a similar manner and to move the vehicle in parallel in the direction in which all of the wheels are steered.

(b) Sharp-Turn Mode

Figure 18A:
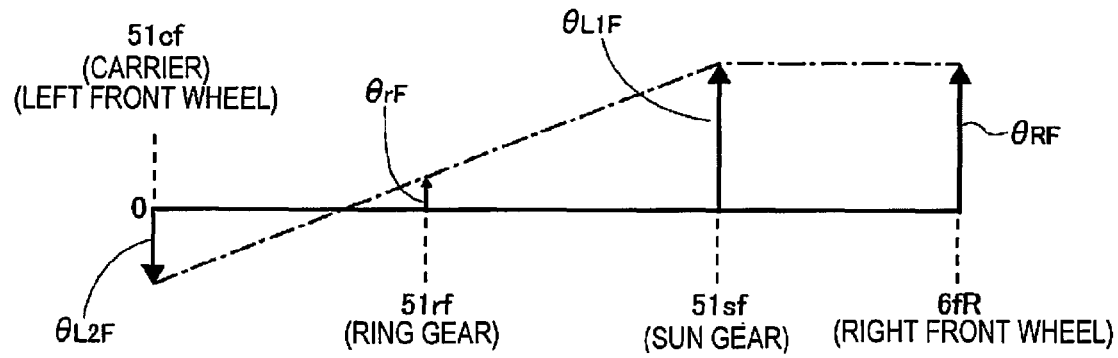
FIGS. 18A and 18B show nomograms for the front-wheel steering angle adjustment differential gear set and the rear-wheel steering angle adjustment differential gear set of the steering device representing the fourth embodiment of the present invention provided when the sharp-turn mode is enabled, where
Figure 18B:
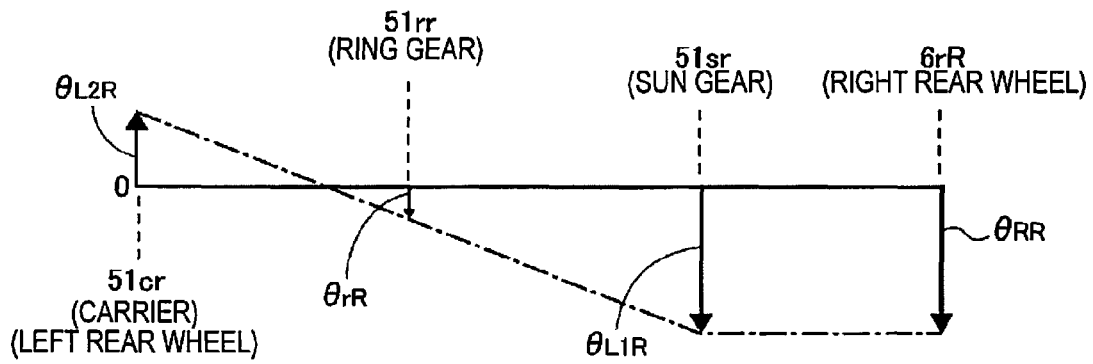

FIGS. 18A, 18B are nomograms showing the rotation speed relationship between the members in the front-wheel-side differential gear set 5f (double-pinion planetary gear set 51f shown in FIGS. 15A and 15B) and the rotation speed relationship between the members in the rear-wheel-side differential gear set 5r (double-pinion planetary gear set 51r shown in FIG. 16), respectively, in the sharp-turn mode in which the left and right front wheels 10fL, 10fR and the left and right rear wheels 10rL, 10rR are reverse-phase-steered so that the vehicle is made to perform a sharp turn about a center point positioned further forward from the extension line of the rear wheel axis by distance $L_R$ as shown in FIG. 7.

As with the instances in which each of the front-wheel-side differential gear set 5f and the rear-wheel-side differential gear set 5r comprises a single-pinion-type planetary gear set, the rotation of each of the steering angle adjustment motors 52f, 52r is controlled so that the aforementioned expressions (9) to (11) are satisfied.

The single-pinion-type planetary gear set shown in FIG. 4A may also be used as the rear-wheel-side differential gear set 5r.

The rotation of each of the steering angle adjustment motors 52f, 52r being controlled as described above results in the nomogram for the front-wheel-side differential gear set 5f shown in FIG. 18A and the nomogram for the rear-wheel-side differential gear set 5r shown in FIG. 18B being completely symmetrical about the reference line representing a rotation speed of zero, and it being possible to reverse-phase-steer the left and right front wheels 10fL, 10fR and the left and right rear wheels 10rL, 10rR as shown as an example in FIG. 7 and cause the vehicle to perform a sharp turn.

(c) Pivot-Turn Mode

Figure 19A:
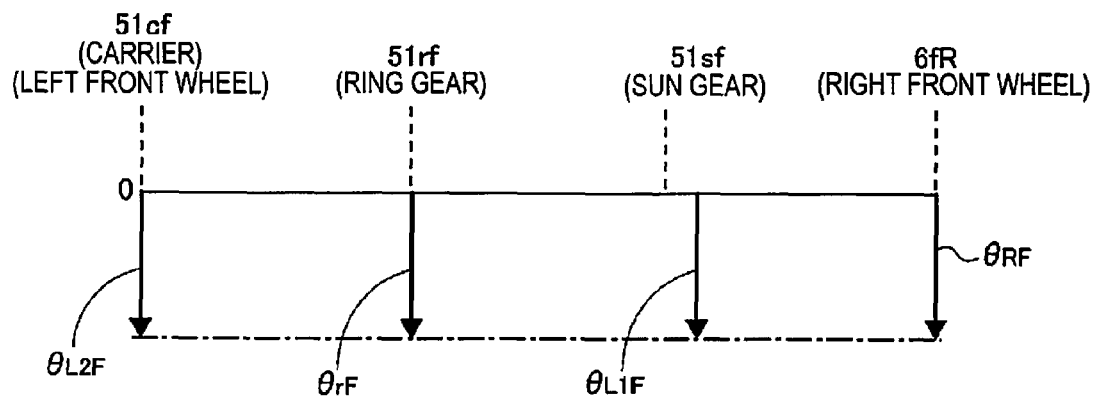
FIGS. 19A and 19B show nomograms for the front-wheel steering angle adjustment differential gear set and the rear-wheel steering angle adjustment differential gear set of the steering device representing the fourth embodiment of the present invention provided when the pivot-turn mode is enabled, where

FIGS. 19A, 17B are nomograms showing the rotation speed relationship between the members in the front-wheel-side differential gear set 5f (double-pinion planetary gear set 51f shown in FIGS. 15A and 15B) and the rotation speed relationship between the members in the rear-wheel-side differential gear set 5r (double-pinion planetary gear set 51r shown in FIG. 16), respectively, in the pivot-turn mode in which the left and right front wheels 10fL, 10fR and the left and right rear wheels 10rL, 10rR are steered so that the respective rotational axes pass through the point at the center of the vehicle body, whereby the vehicle is caused to turn on the spot about the center of the vehicle body, as shown in FIG. 9.

As with the instances in which each of the front-wheel-side differential gear set 5f and the rear-wheel-side differential gear set 5r comprises a single-pinion-type planetary gear set, the rotation of each of the steering angle adjustment motors 52f, 52r is controlled so that the aforementioned expression (16) is satisfied.

The single-pinion-type planetary gear set shown in FIG. 4A may also be used as the rear-wheel-side differential gear set 5r.

Figure 19B:
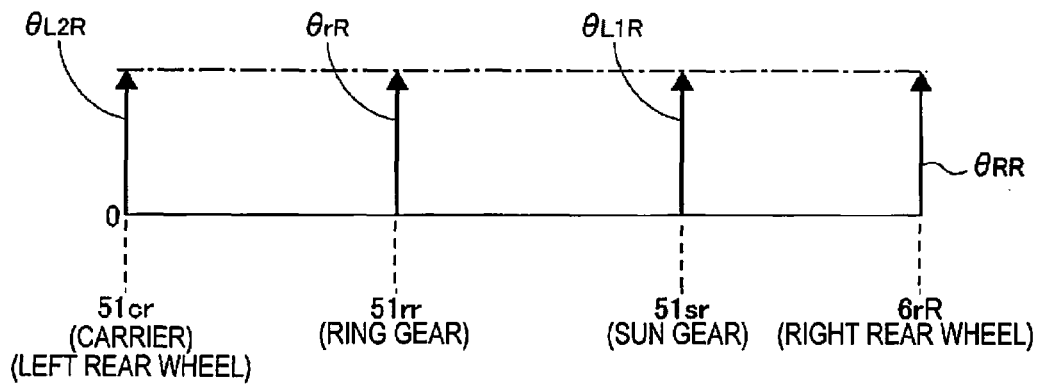

The rotation of each of the steering angle adjustment motors 52f, 52r being controlled as described above results in the nomogram for the front-wheel-side differential gear set 5f shown in FIG. 19A and the nomogram for the rear-wheel-side differential gear set 5r shown in FIG. 19B being shaped as rectangles that are completely symmetrical about the reference line representing a rotation speed of zero, and it being possible to steer the left and right front wheels 10fL, 10fR and the left and right rear wheels 10rL, 10rR as shown as an example in FIG. 9.

In the present embodiment, again, steering the left and right front wheels 10fL, 10fR and the left and right rear wheels 10rL, 10rR as described above in the parallel movement maneuver mode, the sharp-turn mode, or the pivot-turn mode makes it possible to realize each of the modes while satisfying the Ackermann-Jeantaud relationship and prevent the problems of uneven wear and squealing of the wheel tires from being generated in any of the modes.

Embodiment Five

<Configuration>

Figure 20:
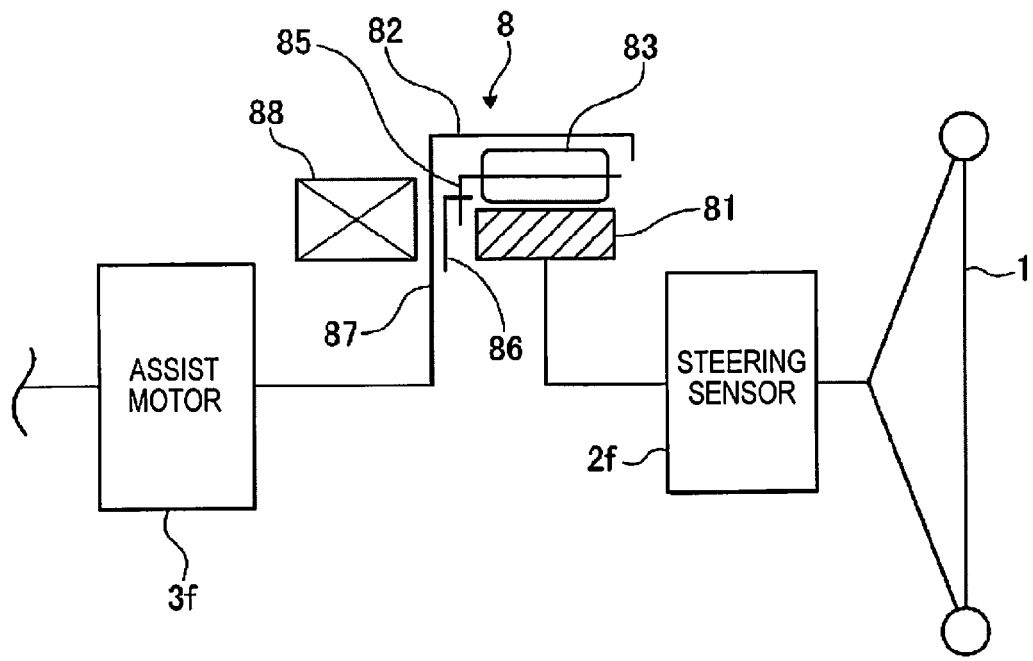
FIG. 20 is an outline diagram schematically showing the steering column shaft portion of the front-wheel steering system in the steering device representing a fifth embodiment of the present invention.
Figure 21:
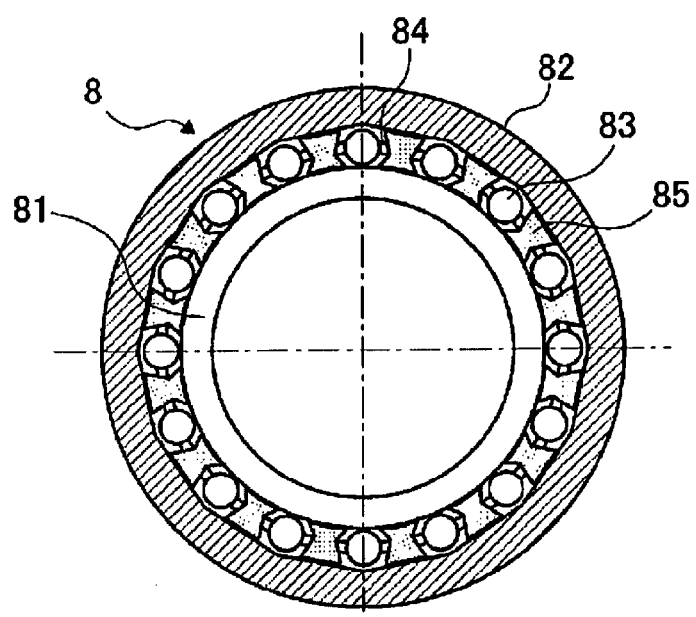
FIG. 21 is a vertical cross-section front view showing, in detail, the connection/disconnection clutch provided to the steering column shaft shown in FIG. 20.

FIGS. 20 and 21 show a steering column shaft of a steering device representing an example of a fifth embodiment of the present invention.

This steering column is divided between the steering wheel 1 and the assist motor 3f, and a connecting/disconnecting clutch 8 functioning as a connecting/disconnecting means or device is interposed between the division sections, as shown in FIG. 20.

As shown in the vertical cross-section front view in FIG. 21, the connecting/disconnecting clutch 8 is concentrically provided with an inner ring 81 and an outer ring 82. The inner ring 81 is coupled to the column shaft division section on the side towards the steering wheel 1 and the outer ring 82 is coupled to the column shaft division section on the side towards the assist motor 3f by an outer ring plate 87.

An inner circumferential rolling surface of the outer ring 82 is shaped as a regular polygon so as to function as a cam surface, and a plurality of rollers 83 are interposed between the inner circumferential rolling surface of the outer ring 82 and an outer circumferential surface of the inner ring 81.

The rollers 83 are held at regular intervals along the circumferential direction between the inner and outer circumferential cam surfaces by a spring 84 and a holder 85.

An electromagnet 88 is provided in the axial direction of the holder 85 so as to face the holder 85. The electromagnet 88, when not energized, allows the holder 85 to rotate, and when energized, suctions an armature 86 integral with the holder 85 to an outer ring plate 87 and thereby immobilizes the holder 85 at a center position.

While the electromagnet 88 is not energized and the holder 85 is capable of rotating, the holder 85 is able to rotate with the outer ring plate 87, the gap between the inner and outer circumferential cam surfaces and the rollers 83 is eliminated, the column shaft division portions are coupled to each other, and the rotation of the steering wheel 1 can be transmitted to the assist motor 3f.

While the electromagnet 88 is energized and the holder 85 is immobilized at the center position, a gap is present between the inner and outer cam surfaces and the rollers 83 allowing the connecting/disconnecting clutch 8 to be disconnected, making it possible to prevent the rotation from being transmitted between the column shaft division portions.

The steering device otherwise has a similar configuration to any of the first through fourth embodiments.

<Effect>

In the present embodiment, the connecting/disconnecting clutch 8 is left disconnected while a maneuver mode unrelated to the operation of the steering wheel 1, such as the parallel movement maneuver mode (including a 90° lateral movement) such as that shown in FIG. 5 or the pivot-turn mode such as that shown in FIG. 9, is enabled.

It is thereby possible, while a maneuver mode unrelated to the operation of the steering wheel 1 is enabled, to prevent the steering wheel 1 from rotating even when the wheels are being steered, and avoid confusion on the part of the driver due to the steering wheel 1 unexpectedly rotating.

A configuration in which, conversely from the above, the connecting/disconnecting clutch 8 is put in a disconnected state when the electromagnet 88 is energized and in a coupled state when the electromagnet 88 is non-energized, the connecting/disconnecting clutch 8 is put in a coupled state when a fault such as a power failure or a loss of control occurs, allowing the driver to mechanically steer the wheels and making it possible to obtain a fail-safe function without using a complex mechanism or control.

In addition, the connecting/disconnecting clutch 8 is disconnected by energization of the electromagnet 88 only when the pivot-turn mode or the 90° lateral movement mode, which are not used frequently, is enabled, making it possible to minimize the amount of power consumed by the energization and delivering a benefit in terms of energy efficiency.

Other Embodiments

In the above first through fifth embodiments, descriptions were given for instances in which the front-wheel-side differential gear set 5f and the rear-wheel-side differential gear set 5r both comprise a single-pinion-type planetary gear set or instances in which the front-wheel-side differential gear set 5f and the rear-wheel-side differential gear set 5r both comprise a double-pinion planetary gear set. However, it shall be apparent that it is also possible for one of the front-wheel-side differential gear set 5f and the rear-wheel-side differential gear set 5r to comprise a single-pinion-type planetary gear set and the other to comprise a double-pinion planetary gear set.

It is also possible for the steering gear sets 7fL, 7fR for the left and right front wheels to be variable speed ratio gear sets and the steering gear sets 7rL, 7rR for the left and right rear wheels to be non-variable speed ratio gear sets for the following reason.

The frequency of use of a maneuver mode employing only the rear-wheel side is extremely low; therefore, it is rare for the differential gear set 5r to be used in a locked state as in the front-wheel side.

Therefore, the rear-wheel side differential gear set 5r does not require a lock mechanism, and controlling of the left- and right-wheel steering angles can be performed using the steering angle adjustment motor 52r. Accordingly, the left- and right-rear-wheel steering gear sets 7rL, 7rR need not necessarily be variable speed ratio gear sets, and may be non-variable speed ratio gear sets.

In an instance in which the left- and right-rear-wheel steering gear sets 7rL, 7rR are non-variable speed ratio gear sets, the size will be smaller than that of variable speed ratio gear sets, making it possible to reduce the size of the left- and right-rear-wheel steering gear sets 7rL, 7rR.

The invention claimed is:

1. A steering device for a vehicle in which left and right front wheels and left and right rear wheels are steered by rotation about a longitudinal axis of a steering shaft provided to each of the wheels so as to extend inwards along the vehicle width direction, the steering device comprising:
   a steering force source configured to transmit a steering force when a steering operation is performed individually on one of the steering shafts of the left and right front wheels and to one of the steering shafts of the left and right rear wheels; and
   a first differential gear set configured to be interposed between an end of the steering shaft of the left front wheel and an end of the right front wheel, the end of the steering shaft of the left front wheel being adjacent the end of the steering shaft of the right front wheel and a second differential gear set configured to be interposed between an end of the steering shaft of the left rear wheel and end of the steering shaft of the right rear wheel, the end of the steering shaft of the left rear wheel being adjacent the end of the steering shaft of the right rear wheel,
   the first differential gear set including a first rotation element, a second rotation element and a third rotation element, the first and second rotation elements of the first differential gear set being coupled the ends of the left and right front wheel steering shafts, respectively, and the second differential gear set including a first rotation element, a second rotation element and a third rotation element, and the first and second rotation elements of the second differential gear set being coupled to the ends of the left and right rear wheel steering shafts, respectively;
   a front-wheel steering angle adjustment actuator drivably coupled to the third rotation element of the first differential gear set; and
   a rear-wheel steering angle adjustment actuator drivably coupled to the third rotation element of the second differential gear set.

2. The steering device according to claim 1, wherein each of the first and second differential gear sets comprises a simple planetary gear set, the first rotation element being a sun gear, the second rotation element being a ring gear of the simple planetary gear set, and the third rotation element being a carrier of the simple planetary gear set, and the front-wheel steering angle adjustment actuator and rear-wheel steering angle adjustment actuator are drivably coupled to the carrier of the first and second differential gear sets, respectively.

3. The steering device according to claim 2, further comprising
   steering gear sets, each of the steering gear sets being configured to convert a rotation of a respective steering shaft of the steering shafts about the longitudinal axis into a rotation about a kingpin axis of a corresponding wheel in assisting with the steering of the corresponding wheel;
   a locking mechanism configured to immobilize the carrier of each of the simple planetary gear sets in both rotation directions; and
   each of the steering gear sets for the left and right wheels comprises a variable speed ratio gear set so that the steering angles of the wheels satisfy the Ackermann-Jeantaud relationship when the lock mechanism is in operation.

4. The steering device according to claim 3, wherein each of the steering gear sets for the left and right front wheels comprises a non-variable speed ratio gear set.

5. The steering device according to claim 4, wherein the front-wheel steering angle adjustment actuator and the rear-wheel steering angle adjustment actuator are configured to be controlled using an actuator control device, on the basis of signals from a vehicle maneuver mode selection unit, a steering operation detection device configured to detect the amount and speed of the steering operation, and the steering angle detection device configured to detect the steering angles of the left and right front wheels and the left and right rear wheels, so as to achieve a selected maneuver mode while satisfying the Ackermann-Jeantaud relationship.

6. The steering device according claim 3, wherein the steering force source is a steering column shaft configured to be coupled to a steering wheel, the steering column shaft being drivably coupled in a mechanical manner to one of the steering shafts,
the steering device further comprising
a steering force connection/disconnection device disposed in a steering force transmission system configured to extend from the steering wheel through the steering column shaft to the one of the steering shafts.

7. The steering device according to claim 3, wherein the front-wheel steering angle adjustment actuator and the rear-wheel steering angle adjustment actuator are configured to be controlled using an actuator control device, on the basis of signals from a vehicle maneuver mode selection unit, a steering operation detection device configured to detect the amount and speed of the steering operation, and the steering angle detection device configured to detect the steering angles of the left and right front wheels and the left and right rear wheels, so as to achieve a selected maneuver mode while satisfying the Ackermann-Jeantaud relationship.

8. The steering device according claim 2, wherein the steering force source is a steering column shaft configured to be coupled to a steering wheel, the steering column shaft being drivably coupled in a mechanical manner to one of the steering shafts,
the steering device further comprising
a steering force connection/disconnection device disposed in a steering force transmission system configured to extend from the steering wheel through the steering column shaft to the one of the steering shafts.

9. The steering device according to claim 2, wherein the front-wheel steering angle adjustment actuator and the rear-wheel steering angle adjustment actuator are configured to be controlled using an actuator control device, on the basis of signals from a vehicle maneuver mode selection unit, a steering operation detection device configured to detect the amount and speed of the steering operation, and the steering angle detection device configured to detect the steering angles of the left and right front wheels and the left and right rear wheels, so as to achieve a selected maneuver mode while satisfying the Ackermann-Jeantaud relationship.

10. The steering device according to claim 1, wherein each of the first and second differential gear sets comprises a double-pinion planetary gear set the first rotation element being a sun gear, the second rotation element being a carrier and the third rotation element being a ring gear of the double-pinion planetary gear set, and the front-wheel steering angle adjustment actuator and rear-wheel steering angle adjustment actuator being drivably coupled to the ring gears of the first and second differential gear sets, respectively.

11. The steering device according to claim 10, further comprising
steering gear sets, each of the steering gear sets being configured to convert a rotation of a respective steering shaft of the steering shafts about the longitudinal axis into a rotation about a kingpin axis of a corresponding wheel in assisting with the steering of the corresponding wheel;
a locking mechanism configured to immobilize the carrier of each of the simple planetary gear sets in both rotation directions; and
each of the steering gear sets for the left and right wheels comprises a variable speed ratio gear set so that the steering angles of the wheels satisfy the Ackermann-Jeantaud relationship when the lock mechanism is in operation.

12. The steering device according to claim 11, wherein each of the steering gear sets for the left and right front wheels comprises a non-variable speed ratio gear set.

13. The steering device according to claim 11, wherein the front-wheel steering angle adjustment actuator and the rear-wheel steering angle adjustment actuator are configured to be controlled using an actuator control device, on the basis of signals from a vehicle maneuver mode selection unit, a steering operation detection device configured to detect the amount and speed of the steering operation, and the steering angle detection device configured to detect the steering angles of the left and right front wheels and the left and right rear wheels, so as to achieve a selected maneuver mode while satisfying the Ackermann-Jeantaud relationship.

14. The steering device according claim 10, wherein the steering force source is a steering column shaft configured to be coupled to a steering wheel, the steering column shaft being drivably coupled in a mechanical manner to one of the steering shafts,
the steering device further comprising
a steering force connection/disconnection device disposed in a steering force transmission system configured to extend from the steering wheel through the steering column shaft to the one of the steering shafts.

15. The steering device according claim 11, wherein the steering force source is a steering column shaft configured to be coupled to a steering wheel, the steering column shaft being drivably coupled in a mechanical manner to one of the steering shafts,
the steering device further comprising
a steering force connection/disconnection device disposed in a steering force transmission system configured to extend from the steering wheel through the steering column shaft to the one of the steering shafts.

16. The steering device according to claim 10, wherein the front-wheel steering angle adjustment actuator and the rear-wheel steering angle adjustment actuator are configured to be controlled using an actuator control device, on the basis of signals from a vehicle maneuver mode selection unit, a steering operation detection device configured to detect the amount and speed of the steering operation, and the steering angle detection device configured to detect the steering angles of the left and right front wheels and the left and right rear wheels, so as to achieve a selected maneuver mode while satisfying the Ackermann-Jeantaud relationship.

17. The steering device according claim 1, wherein
the steering force source is a steering column shaft configured to be coupled to a steering wheel, the steering column shaft being drivably coupled in a mechanical manner to one of the steering shafts,
the steering device further comprising
a steering force connection/disconnection device disposed in a steering force transmission system configured to extend from the steering wheel through the steering column shaft to the one of the steering shafts.

18. The steering device according to claim 17, wherein
the front-wheel steering angle adjustment actuator and the rear-wheel steering angle adjustment actuator are configured to be controlled using an actuator control device, on the basis of signals from a vehicle maneuver mode selection unit, a steering operation detection device configured to detect the amount and speed of the steering operation, and the steering angle detection device configured to detect the steering angles of the left and right front wheels and the left and right rear wheels, so as to achieve a selected maneuver mode while satisfying the Ackermann-Jeantaud relationship.

19. The steering device according to claim 1, wherein
the front-wheel steering angle adjustment actuator and the rear-wheel steering angle adjustment actuator are configured to be controlled using an actuator control device, on the basis of signals from a vehicle maneuver mode selection unit, a steering operation detection device configured to detect the amount and speed of the steering operation, and the steering angle detection device configured to detect the steering angles of the left and right front wheels and the left and right rear wheels, so as to achieve a selected maneuver mode while satisfying the Ackermann-Jeantaud relationship.

\* \* \* \* \*